(12) United States Patent
Fukudome

(10) Patent No.: US 9,176,699 B2
(45) Date of Patent: Nov. 3, 2015

(54) PRINTING SYSTEM, PRINTING DEVICE, METHOD FOR CONTROLLING THE PRINTING DEVICE, AND COMPUTER-READABLE STORAGE MEDIUM FOR COMPUTER PROGRAM, FOR EXECUTING A PLURALITY OF PRINT JOBS BASED ON GROUP INFORMATION

(71) Applicant: Konica Minolta, Inc., Chiyoda-ku (JP)

(72) Inventor: Kenji Fukudome, Kawabe-gun (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 35 days.

(21) Appl. No.: 14/038,849

(22) Filed: Sep. 27, 2013

(65) Prior Publication Data

US 2014/0092420 A1      Apr. 3, 2014

(30) Foreign Application Priority Data

Oct. 3, 2012   (JP) .................................. 2012-221484

(51) Int. Cl.
```
G06F 3/12       (2006.01)
H04N 1/00       (2006.01)
H04N 1/32       (2006.01)
```
(52) U.S. Cl.
CPC ............ *G06F 3/1295* (2013.01); *G06F 3/1222* (2013.01); *G06F 3/1238* (2013.01); *G06F 3/1262* (2013.01); *G06F 3/1267* (2013.01); *G06F 3/1288* (2013.01); *G06F 3/1296* (2013.01); *H04N 1/0023* (2013.01); *H04N 1/00233* (2013.01); *H04N 1/00244* (2013.01); *H04N 1/00875* (2013.01); *H04N 1/00957* (2013.01); *H04N 1/324* (2013.01);

(Continued)

(58) Field of Classification Search
None
See application file for complete search history.

(56) References Cited

U.S. PATENT DOCUMENTS

| | | | | |
|---|---|---|---|---|
| 5,970,218 | A | * | 10/1999 | Mullin et al. ................ 358/1.15 |
| 6,151,464 | A | * | 11/2000 | Nakamura et al. .............. 399/79 |
| 2002/0063886 | A1 | * | 5/2002 | Johnson ...................... 358/1.15 |
| 2003/0007819 | A1 | | 1/2003 | Wanda |
| 2011/0063667 | A1 | | 3/2011 | Nishida |

FOREIGN PATENT DOCUMENTS

| | | |
|---|---|---|
| JP | 2001-075768 A | 3/2001 |
| JP | 2004-58501 A | 2/2004 |

(Continued)

OTHER PUBLICATIONS

Office Action (Notification of Reason(s) for Refusal) issued on Oct. 7, 2014, by the Japan Patent Office in corresponding Japanese Patent Application No. 2012-221484, and an English Translation of the Office Action. (8 pages).

(Continued)

*Primary Examiner* — Thomas D Lee

(74) *Attorney, Agent, or Firm* — Buchanan Ingersoll & Rooney PC

(57) ABSTRACT

A printing system having a print portion is provided. The printing system includes a storage portion configured to store job data based on which a plurality of first print jobs is executed, the first print jobs being instructed by a specific user; an obtaining portion configured to, in response to a request made by the specific user, obtain group information on a group of the first print jobs; and a job execution portion configured to, after the print portion starts the first print jobs, leave a second print job other than the first print jobs unexecuted and execute all of the first print jobs based on the group information, and after that, execute the second print job.

16 Claims, 38 Drawing Sheets

(52) U.S. Cl.
CPC .... *H04N1/32106* (2013.01); *H04N 2201/0094* (2013.01); *H04N 2201/3205* (2013.01); *H04N 2201/3208* (2013.01); *H04N 2201/3221* (2013.01); *H04N 2201/3226* (2013.01); *H04N 2201/3274* (2013.01); *H04N 2201/3278* (2013.01)

(56) References Cited

FOREIGN PATENT DOCUMENTS

| JP | 2006-085625 A | 3/2006 |
|---|---|---|
| JP | 2007-058417 A | 3/2007 |
| JP | 2008-077355 A | 4/2008 |
| JP | 2008-90385 A | 4/2008 |
| JP | 2009-146336 A | 7/2009 |
| JP | 2011-60239 A | 3/2011 |
| JP | 2013-233667 A | 11/2013 |

OTHER PUBLICATIONS

Japanese Official Communication (Notification of Reasons for Refusal) dated Feb. 24, 2015 in corresponding Japanese Patent Application No. 2012-221484, and English translation thereof (8 pages).

* cited by examiner

| FILE NAME | USER IDENTIFICATION CODE | IP ADDRESS | |
|---|---|---|---|
| 20120528A0001 | U001 | 192.168.1.21 | ~6M |
| 20120528A0002 | U001 | 192.168.1.22 | ~6M |
| 20120528A0003 | U001 | 192.168.1.23 | ~6M |
| 20120528A0004 | U001 | 192.168.1.22 | ~6M |
| 20120528A0005 | U001 | 192.168.1.23 | ~6M |
| 20120528B0031 | U023 | 192.168.1.21 | ~6M |
| 20120528B0032 | U023 | 192.168.1.22 | ~6M |
| ⋮ | ⋮ | ⋮ | |

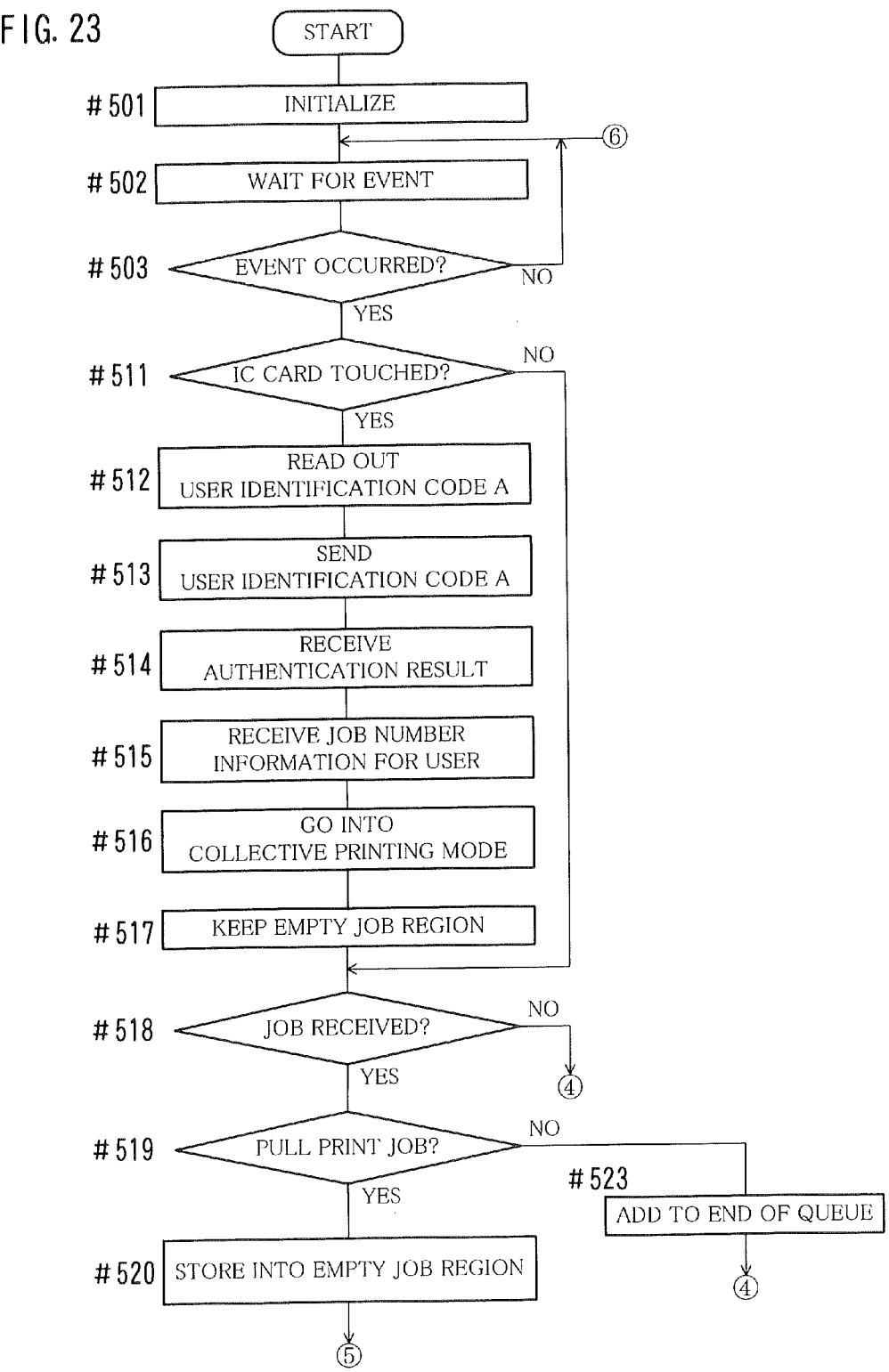

PRINTING SYSTEM, PRINTING DEVICE, METHOD FOR CONTROLLING THE PRINTING DEVICE, AND COMPUTER-READABLE STORAGE MEDIUM FOR COMPUTER PROGRAM, FOR EXECUTING A PLURALITY OF PRINT JOBS BASED ON GROUP INFORMATION

This application is based on Japanese patent application No. 2012-221484 filed on Oct. 3, 2012, the contents of which are hereby incorporated by reference.

BACKGROUND OF THE INVENTION

1. Field of the Invention

The present invention relates to a printing system and printing device that are shared by a plurality of users, and so on.

2. Description of the Related Art

Recent years have seen the widespread use of image forming apparatuses that have various functions such as copying, scanning, faxing, and Internet Protocol (IP) communication. Such an image forming apparatus is called a "Multi-Functional Peripheral" (MFP) or a "multifunction device". The various functions are applied by applications in different ways, which enables an image forming apparatus to provide users with a wide variety of services. Some services are proposed which are offered by the image forming apparatus working in conjunction with a server.

One of such proposed services is called "pull printing". According to the pull printing service, print data sent by a terminal such as a personal computer is temporarily held on a server named "pull printing server" instead of being received promptly by an image forming apparatus. The pull printing server receives sets of print data from personal computers installed in different locations and manages the sets of print data collectively. When a user goes to the installation site of a certain image forming apparatus and performs predetermined operation thereon, the pull printing server sends print data of the user to the image forming apparatus.

According to the pull printing service, a print job is executed after the user gets to the installation site of the image forming apparatus. The service therefore enables the user to obtain a printed matter based on the print job more reliably than the case where the print job is executed immediately after the print data is sent directly to the image forming apparatus without a server.

Meanwhile, one user sometimes instructs an image forming apparatus to execute a plurality of jobs through the pull printing service. In such a case, it is desirable that printed matters produced based on the jobs are not confused with the other printed matters related to the other users.

To cope with this, the following method has been proposed. In a printer which is connected to a network to receive printing data and prints the data, an IP address of an apparatus which transmits data is managed together with printing data, and the sequence of received data is managed together with printing data, whereby data sent from the same apparatus is printed out consecutively (see the English Abstract of Japanese Laid-open Patent Publication No. 2004-058501).

A print server stores pint jobs accepted from a PC in a storage unit in order to wait for printing of a printer; however when it becomes possible to transmit the print jobs to the printer, the print server issues a print execution instruction to a print job at a top of print order and transfers the instruction to the printer, and if a print job of the same user as the print job to which the print is instructed is stored in the storage unit, the print server changes the print order so that the print job of the same user is issued a print instruction in succession the print job to which the print execution instruction has been issued (see the English Abstract of Japanese Laid-open Patent Publication No. 2008-090385).

In some cases, a plurality of users shares one terminal. In other cases, while a printing device receives a plurality of sets of print data in succession from one transmission source, the printing device receives print data from another transmission source.

In such a case, according to the conventional methods, the printing device sometimes executes, between a plurality of print jobs instructed by one user, a different print job related to another user. This probably causes confusion between printed matters related to one user and the different printed matter related to the other user.

The present invention has been achieved in light of such an issue, and an object thereof is to prevent desired printed matters produced based on print jobs instructed by a specific user from mixing with another printed matter produced based on a print job instructed by another user.

SUMMARY

A printing system according to one aspect of the present invention is a printing system having a print portion. The printing system includes a storage portion configured to store job data based on which a plurality of first print jobs is executed, the first print jobs being instructed by a specific user; an obtaining portion configured to, in response to a request made by the specific user, obtain group information on a group of the first print jobs; and a job execution portion configured to, after the print portion starts the first print jobs, leave a second print job other than the first print jobs unexecuted and execute all of the first print jobs based on the group information, and after that, execute the second print job.

These and other characteristics and objects of the present invention will become more apparent by the following descriptions of preferred embodiments with reference to drawings.

BRIEF DESCRIPTION OF THE DRAWINGS

FIG. 15 is a diagram showing an example of job management records.

FIG. 23 is a flowchart for depicting an example of the flow of the overall processing performed by an image forming apparatus.

DESCRIPTION OF THE PREFERRED EMBODIMENTS

First Embodiment

Figure 1:
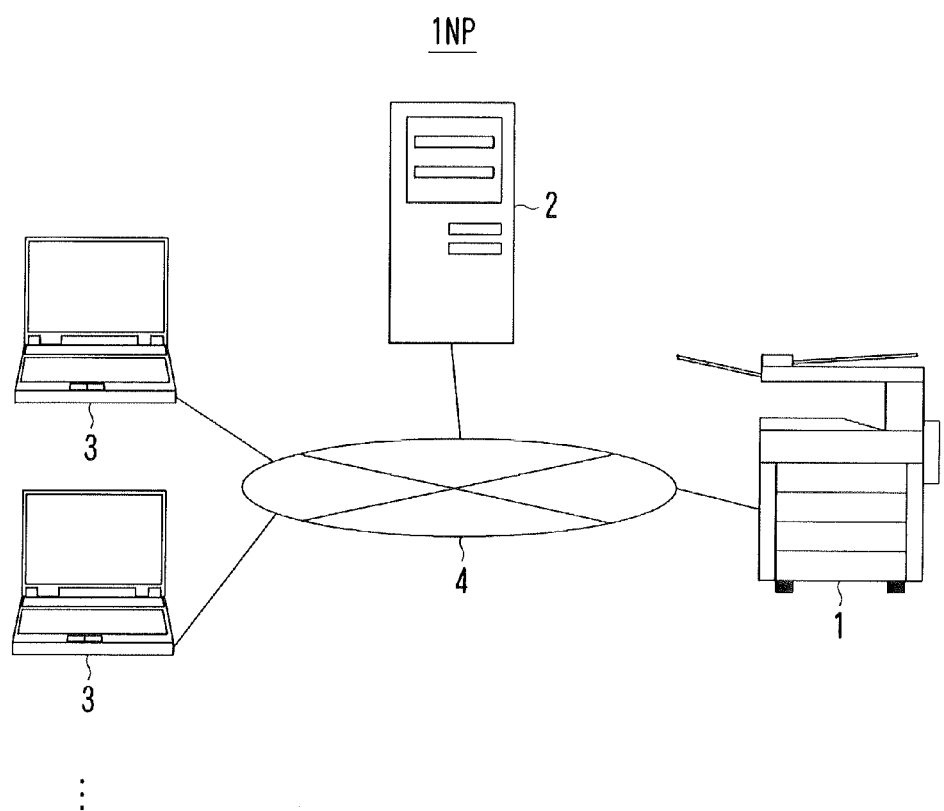
FIG. 1 is a diagram showing an example of the overall configuration of a network printing system.
Figure 2:
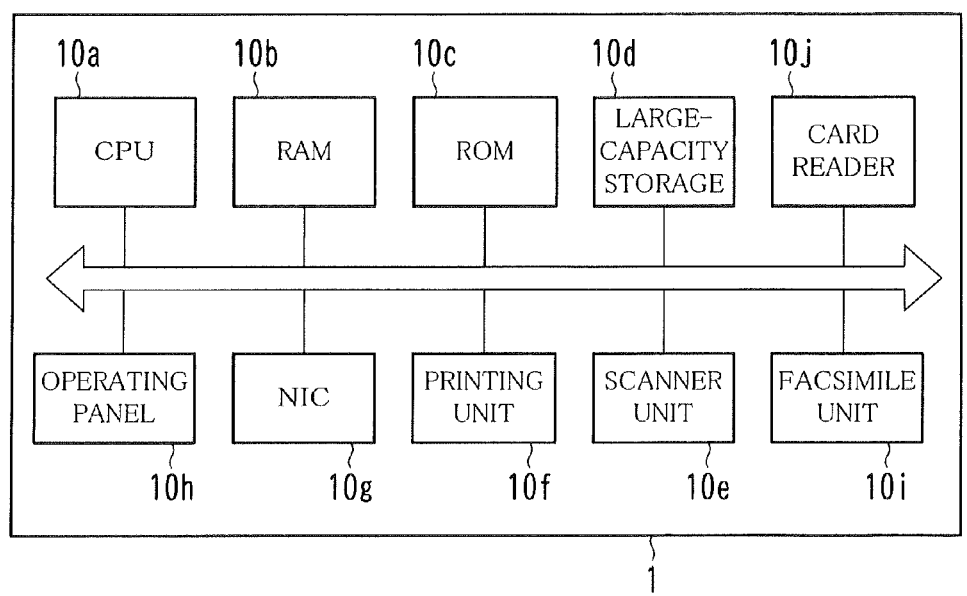
FIG. 2 is a diagram showing an example of the hardware configuration of an image forming apparatus.
Figure 3:
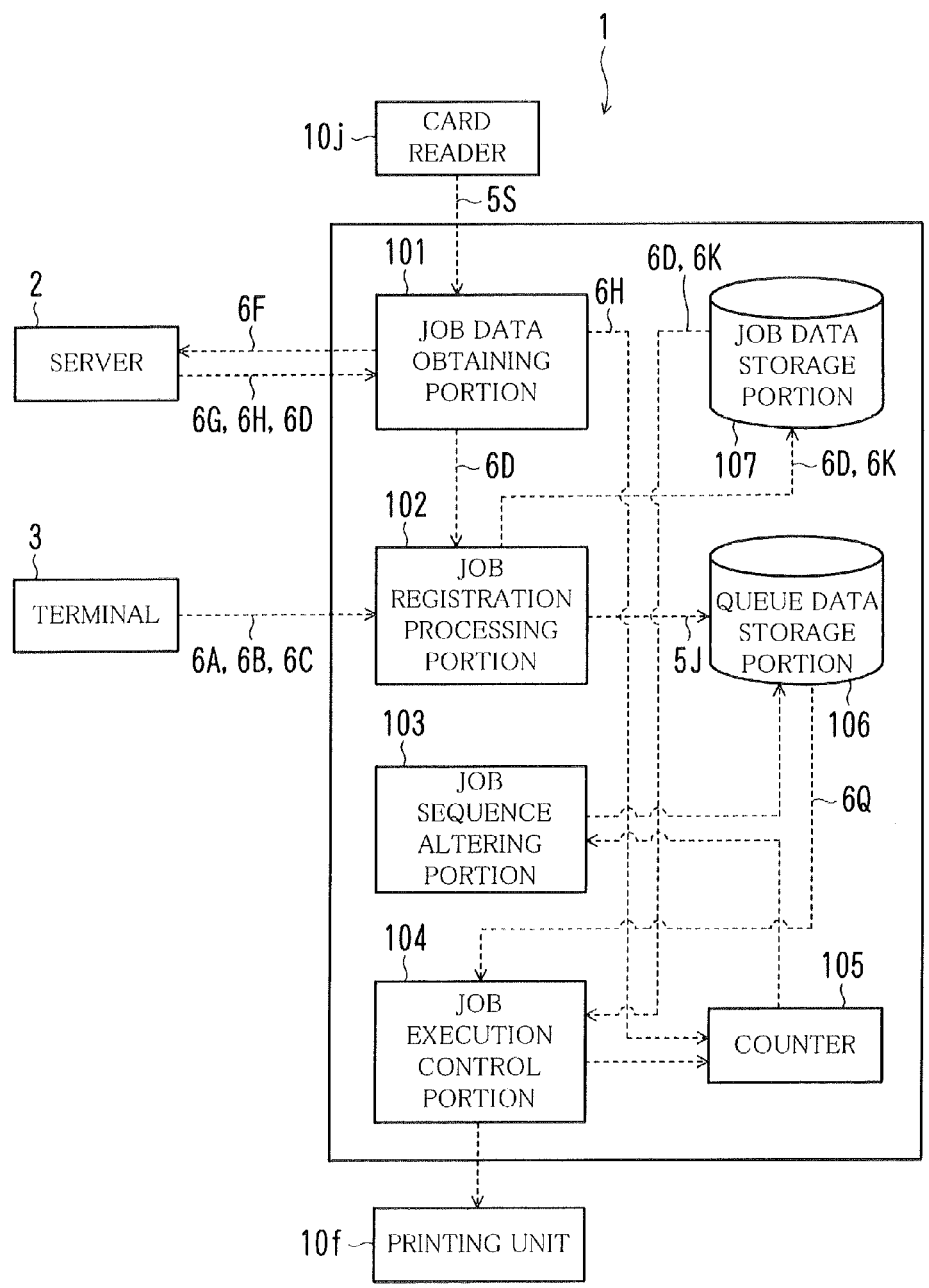
FIG. 3 is a diagram showing an example of the functional configuration of an image forming apparatus.
Figure 4:
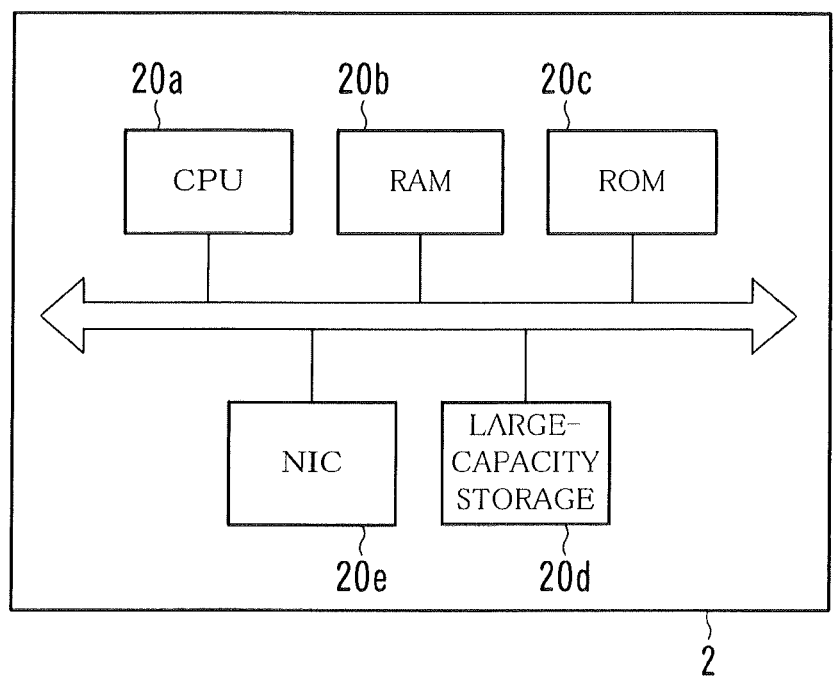
FIG. 4 is a diagram showing an example of the hardware configuration of a server.
Figure 5:
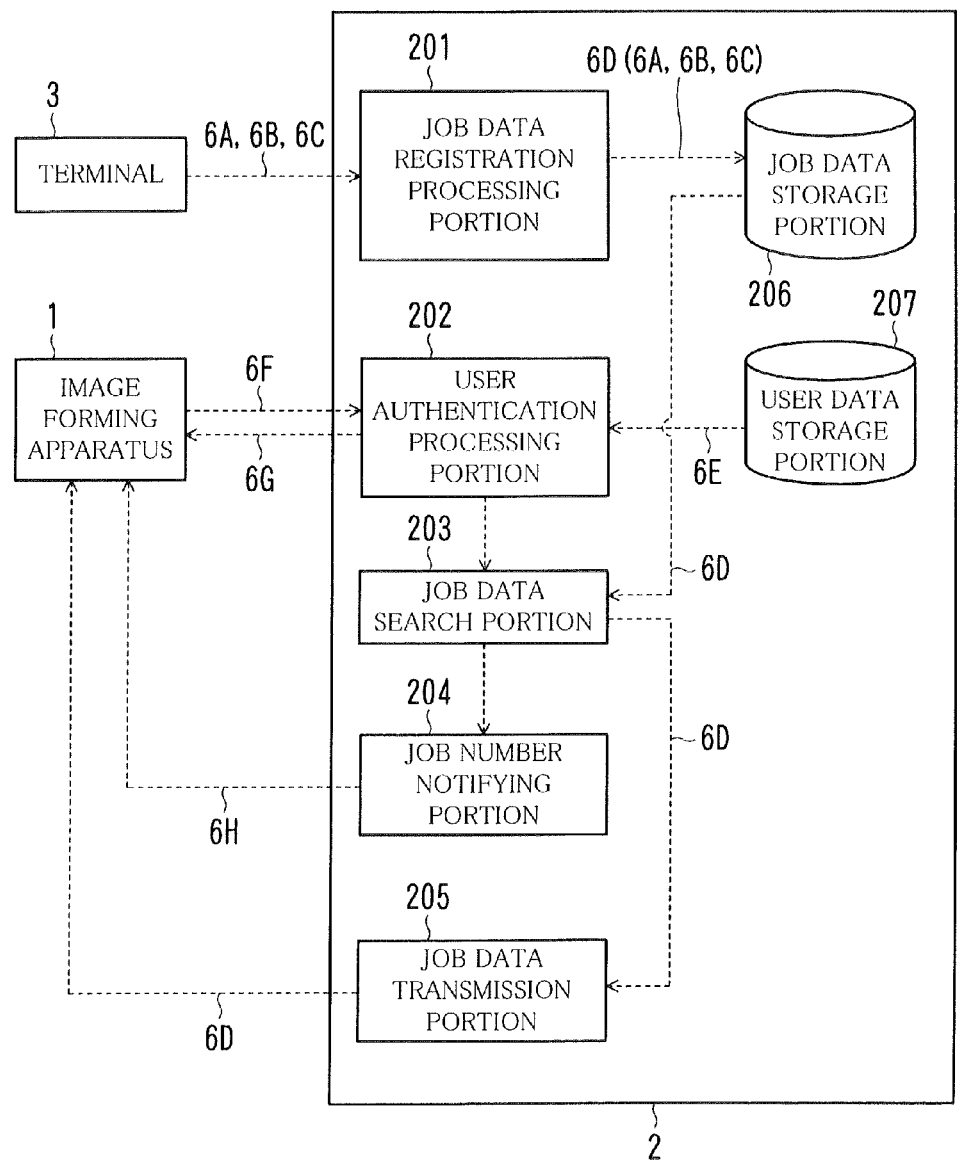
FIG. 5 is a diagram showing an example of the functional configuration of a server.
Figure 6:
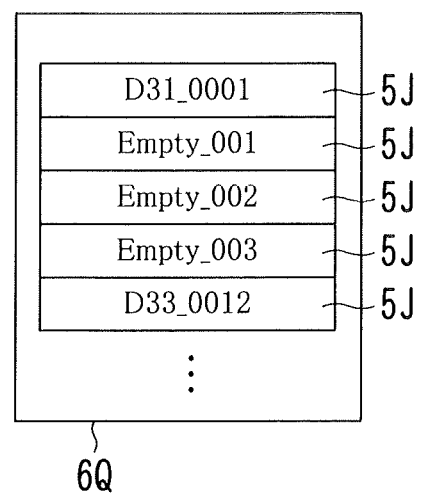
FIG. 6 is a diagram showing an example of queue data.

FIG. 1 is a diagram showing an example of the overall configuration of a network printing system 1NP; FIG. 2 is a diagram showing an example of the hardware configuration of an image forming apparatus 1; FIG. 3 is a diagram showing an example of the functional configuration of the image forming apparatus 1; FIG. 4 is a diagram showing an example of the hardware configuration of a server 2; FIG. 5 is a diagram showing an example of the functional configuration of the server 2; and FIG. 6 is a diagram showing an example of queue data 6Q.

Referring to FIG. 1, the network printing system 1NP is configured of the image forming apparatus 1, the server 2, a plurality of terminals 3, a communication line 4, and so on.

The individual devices of the network printing system 1NP are configured to perform communication with one another via the communication line 4. Examples of the communication line 4 are a Local Area Network (LAN), a dedicated line, and a public line.

The network printing system 1NP is installed in corporations or public offices and used by members of the offices. In short, the members of the offices are users of the network printing system 1NP. Each of the users is given an Integrated Circuit (IC) card 50 onto which his/her unique user identification code 5S is recorded.

The image forming apparatus 1 is an apparatus that is generally called a "Multi-Functional Peripheral (MFP)" or a "multifunction device". The image forming apparatus 1 is an apparatus into which various functions such as copying, PC printing, faxing, and scanning are consolidated.

The PC print function is a function to print an image onto paper based on image data received from the terminal 3. The PC print function is sometimes called a "network printer function" or "network printing function".

The PC print function is broadly classified into a pull printing function and a direct printing function. Both the functions are different from each other in method for sending and receiving image data (print data) between the terminal and the image forming apparatus.

According to the pull printing function, image data sent from the terminal is temporarily held on a server named "pull printing server" instead of being received promptly by the image forming apparatus 1. The pull printing server receives a plurality of sets of image data from the terminals installed in different locations and manages the sets of image data collectively. When a user goes to the installation site of a certain image forming apparatus and performs predetermined operation thereon, the pull printing server sends the image data of the user to the image forming apparatus. In this embodiment, the user performs, as the predetermined operation, operation for touching his/her IC card onto a card reader. A service of starting printing in response to the operation for touching the IC card onto the card reader is generally called "touch printing" or "Follow Me Printing (FMP)".

In contrast, according to the direct printing function, image data sent from a terminal is directly received by an image forming apparatus without a pull printing server.

Referring to FIG. 2, the image forming apparatus 1 is configured of a Central Processing Unit (CPU) 10a, a Random Access Memory (RAM) 10b, a Read Only Memory (ROM) 10c, a large-capacity storage 10d, a scanner unit 10e, a printing unit 10f, a Network Interface Card (NIC) 10g, an operating panel 10h, a facsimile unit 10i, a card reader 10j, a variety of types of control circuits, and so on.

The NIC 10g performs communication with the server 2 and the terminal 3 in accordance with a protocol such as Transmission Control Protocol/Internet Protocol (TCP/IP).

The operating panel 10h is configured of a key entry portion, a touch-sensitive panel display, and so on. The key entry portion is a so-called hardware keyboard, and includes a numeric keypad, a start key, a stop key, and a function key. The touch-sensitive panel display serves to display, for example, a screen for presenting messages or instructions to a user, a screen for allowing a user to input desired processing types and conditions, and a screen showing the results of processing performed by the CPU 10a, for example. A user operates the key entry portion or the touch-sensitive panel display while viewing the screens, which allows the user to input information and commands to the image forming apparatus 1.

The scanner unit 10e serves to read an image recorded on a sheet of paper placed on a document glass, and to generate image data thereof.

The facsimile unit 10i sends and receives image data with a facsimile terminal via a public telephone line in accordance with a protocol such as G3.

The printing unit 10f serves to print, onto a recording medium such as paper, an image read by the scanner unit 10e and an image indicated in image data sent by the terminal 3 or a fax terminal.

The card reader 10j is an IC card reader, and is used to read out a user code from an IC card 50. As discussed later, a user is allowed to cause the image forming apparatus 1 to execute all the PC print jobs of the user through the pull printing function merely by touching his/her IC card 50 onto the card reader 10j.

The ROM 10c or the large-capacity storage 10d has installed therein software for implementing the functions of a job data obtaining portion 101, a job registration processing portion 102, a job sequence altering portion 103, a job execution control portion 104, a counter 105, a queue data storage portion 106, a job data storage portion 107, and so on, all of which are shown in FIG. 3. Modules of the software are loaded into the RAM 10b as necessary, and are executed by the CPU 10a. The large-capacity storage 10d is a Hard Disk Drive (HDD) or a Solid State Drive (SSD).

Referring back to FIG. 1, the server 2 is a pull printing server. To be specific, the server 2 receives sets of image data from the terminals 3 and manages the sets of image data in an integrated manner. The server 2 also delivers the image data to the image forming apparatus 1 in response to a request therefrom.

Referring to FIG. 4, the server 2 is configured of a CPU 20a, a RAM 20b, a ROM 20c, a large-capacity storage 20d, an NIC 20e, and so on. A so-called server machine is used as the server 2.

The NIC 20e performs communication with the image forming apparatus 1 and the terminal 3 in accordance with a protocol such as TCP/IP.

The ROM 20c or the large-capacity storage 20d stores, therein, software for implementing a job data registration processing portion 201, a user authentication processing portion 202, a job data search portion 203, a job number notifying portion 204, a job data transmission portion 205, a job data storage portion 206, a user data storage portion 207, and so on, all of which are shown in FIG. 5. Modules of the software are loaded into the RAM 20b as necessary, and are executed by the CPU 20a. The large-capacity storage 20d is an HDD or an SSD.

Referring back to FIG. 1, each of the terminals 3 is a client to receive services such as PC printing service. The terminal 3 has installed therein a driver for allowing the terminal 3 to send data for printing a document to the image forming apparatus 1 or the server 2. The terminal 3 may be a personal computer, a smartphone, a Personal Digital Assistant (PDA), or the like.

The following is a description of print job processing performed by the individual portions of the image forming apparatus 1 shown in FIG. 3, the individual portions of the server 2 shown in FIG. 5, and the terminal 3. Note that a "print job" is a job which involves printing an image onto a recording medium such as paper. Examples of the print job are a job for making a copy of an image (hereinafter, referred to as a "copy job"), a job for PC printing (hereinafter, referred to as a "PC print job"), and a job for receiving an image through facsimile transmission to print the image (hereinafter, referred to as a "facsimile receiving job").

The queue data storage portion 106 of the image forming apparatus 1 stores, therein, queue data 6Q indicating identification codes of print jobs in queue as shown in FIG. 6. Such an identification code is hereinafter referred to as a "job identification code 5J". No job identification codes 5J are indicated in the queue data 6Q at the beginning. As described later, the job identification codes 5J are added to the queue data 6Q in order.

When a print job in queue begins to be executed, a job identification code 5J of the print job is deleted from the queue data 6Q. When the image forming apparatus 1 is ready to start the next print job, as a rule, a print job corresponding to the job identification code 5J listed at the top of the queue data 6Q is started.

The user performs the operation described below to cause the image forming apparatus 1 to execute a print job.

The user uses his/her user identification code 5S to log into the terminal 3 and prepares document data. For example, the user prepares a document by using application such as word processing software or rendering software. Alternatively, the user downloads document data from a server on the Internet or the like. For using the direct printing function, the user designates the image forming apparatus 1 which is to execute the print job. For using the pull printing function, the user selects an option of the pull printing function. In either function, the user designates conditions (the set of prints and print side, for example) for the print job. After that, the user enters a predetermined command into the terminal 3.

In response to the command, the terminal 3 converts the document data into print data 6A that is specific page description language data. The terminal 3 then generates conditions data 6B indicating the conditions for the print job and user identification data 6C indicating the user identification code 5S of the user. The terminal 3 then sends the print data 6A, the conditions data 6B, and the user identification data 6C. In the case of using the direct printing function, the terminal 3 sends the sets of data to the image forming apparatus 1 selected by the user. On the other hand, when the pull printing function is used, or, namely, when the option of the pull printing function is selected, the terminal 3 sends the sets of data to the server 2. For the direct printing function, sending the user identification data 6C is unnecessary.

In the server 2, the job data registration processing portion 201 receives the print data 6A, the conditions data 6B, and the user identification data 6C from the terminal 3. The job data registration processing portion 201 brings the print data 6A, the conditions data 6B, and the user identification data 6C together to generate one set of pull print job data 6D, which is stored into the job data storage portion 206.

The job data storage portion 206 accumulates data on print jobs that have been instructed by the users.

The user data storage portion 207 stores, in advance, an identification code table 6E in which the user identification codes 5S of the users are indicated.

In the case of using the pull printing function, as discussed above, the user causes the terminal 3 to perform the processing for sending the print data 6A and so on to the image forming apparatus 1, and goes to the installation site of the image forming apparatus 1. The user then brings his/her IC card 50 into contact with the card reader 10j of the image forming apparatus 1.

In response to this operation, the card reader 10j reads out the user identification code 5S recorded on the IC card 50.

When the user identification code 5S is read out, the job data obtaining portion 101 obtains data on the pull print job of the user corresponding to the user identification code 5S in the following manner.

The job data obtaining portion 101 sends job request data 6F indicating the user identification code 5S thus read out to the server 2 to request the data on the job from the server 2.

In the server 2, upon receipt of the job request data 6F, the user authentication processing portion 202 performs user authentication processing as follows.

The user authentication processing portion 202 checks whether or not the user identification code 5S indicated in the job request data 6F is shown in the identification code table 6E stored in the user data storage portion 207. If the user identification code 5S is indicated therein, then the user authentication processing portion 202 determines that the user is an authentic user. Otherwise, the user authentication processing portion 202 determines that the user is not an authentic user. The user authentication processing portion 202 then sends user authentication result data 6G showing the determination result to the image forming apparatus 1 from which the job request data 6F has been sent.

When the user authentication processing portion 202 determines that the user is an authentic user, the job data search portion 203 searches for pull print job data 6D indicating the user identification code 5S shown in the job request data 6F. Hereinafter, a user who has been determined to be an authentic user is referred to as a "logged-in user".

The job number notifying portion 204 transmits job number data 6H indicating the number of sets of pull print job data 6D found out by the search by the job data search portion 203 (hereinafter, such number being referred to as a "pull print job number Sp"), as set information (group information) showing a set (group) of print jobs for the user concerned, to the image forming apparatus 1 from which the job request data 6F has been transmitted.

The job data transmission portion 205 transmits the pull print job data 6D found out by the search by the job data search portion 203 to the image forming apparatus 1 from which the job request data 6F has been sent. When a plurality of sets of pull print job data 6D is found out by the search, the job data transmission portion 205 transmits the same one by one.

Note that the job number data 6H is transmitted to the image forming apparatus 1 prior to the pull print job data 6D.

When the user authentication processing portion 202 determines that the user is not an authentic user, transmission of the pull print job data 6D and the job number data 6H is not performed.

In the image forming apparatus 1, the job data obtaining portion 101 receives the job number data 6H and the pull print job data 6D from the server 2.

The job registration processing portion 102 performs processing for entering a print job into a queue in the following manner.

When the job data obtaining portion 101 obtains the pull print job data 6D, the job registration processing portion 102 issues a unique job identification code 5J, and adds the unique job identification code 5J to the bottom of the queue data 6Q. The job registration processing portion 102 also associates the obtained pull print job data 6D with the unique job identification code 5J issued, and stores the resultant into the job data storage portion 107.

When print data 6A, conditions data 6B, and user identification data 6C are transmitted from the terminal 3 without the server 2, the job registration processing portion 102 issues a unique job identification code 5J and adds the unique job identification code 5J to the bottom of the queue data 6Q. The print data 6A, the conditions data 6B, and the user identification data 6C are integrated into one set of direct print job data 6K. The direct print job data 6K is associated with the unique job identification code 5J, and the resultant is stored into the job data storage portion 107. However, when no user identification data 6C is received, incorporating user identification data 6C into the direct print job data 6K is unnecessary.

When receiving the job number data 6H, the image forming apparatus 1 goes into a collective printing mode. When the image forming apparatus 1 is not placed in the collective printing mode, and is ready to start the next print job (in other words, when an active print job has been completed, or there are no active jobs), in accordance with the rule, the execution of a print job corresponding to the job identification code 5J listed at the top of the queue data 6Q is started. When the image forming apparatus 1 is placed in the collective printing mode, the job sequence altering portion 103 changes the order that pull print jobs are to be executed in the following manner.

The job sequence altering portion 103 performs processing for altering the sequence of job identification codes 5J in the queue data 6Q as follows.

The job sequence altering portion 103 searches for job data associated with the job identification code 5J indicated at the top of the queue data 6Q.

If the job data found out by the search corresponds to direct print job data 6K, then the job sequence altering portion 103 updates the queue data 6Q in such a manner that the job identification code 5J is listed at the bottom of the queue data 6Q. This changes the sequence of a job corresponding to the job identification code 5J to the last.

On the other hand, if the job data found out by the search corresponds to pull print job data 6D, then the job sequence altering portion 103 does not perform the sequence change processing. At this time, just to make sure, is possible to check whether or not the pull print job data 6D corresponds to a job instructed by the logged-in user. Stated differently, it is possible to check whether or not the user identification code 5S read out by the card reader 10j is indicated in the pull print job data 6D. If the user identification code 5S is indicated therein, then the job sequence altering portion 103 does not perform the sequence change processing. Otherwise, the job sequence altering portion 103 may update the queue data 6Q in such a manner that the job identification code 5J is listed at the bottom of the queue data 6Q.

The job execution control portion 104 controls the printing unit 10f and so on as discussed below so that a print job is executed.

The job execution control portion 104 retrieves the queue data 6Q from the queue data storage portion 106. The job execution control portion 104 also retrieves job data associated with the job identification code 5J listed at the top of the queue data 6Q from the job data storage portion 107. The retrieved job data is the pull print job data 6D or the direct print job data 6K. The job execution control portion 104 then controls the printing unit 10f and so on in such a manner that the print job is executed based on the job data thus retrieved. When the image forming apparatus 1 is put in the collective printing mode, the job sequence altering portion 103 modifies the queue data 6Q as needed, and then, the post-modified queue data 6Q is retrieved.

The counter 105 serves to count the number of times at which pull print jobs instructed by the logged-in user are executed in the following manner.

The counter 105 has executed job number data 6L showing executed job number Sj. The initial value of the executed job number Sj is zero. The counter 105 updates the executed job number data 6L in such a manner that the executed job number Sj is incremented by one every time when a print job is executed based on the pull print job data 6D which indicates the user identification code 5S of the logged-in user.

At a time when the executed job number Sj indicated in the executed job number data 6L becomes equal to pull print job number Sp indicated in the job number data 6H, the collective printing mode of the image forming apparatus 1 is switched from ON to OFF.

Figure 7:
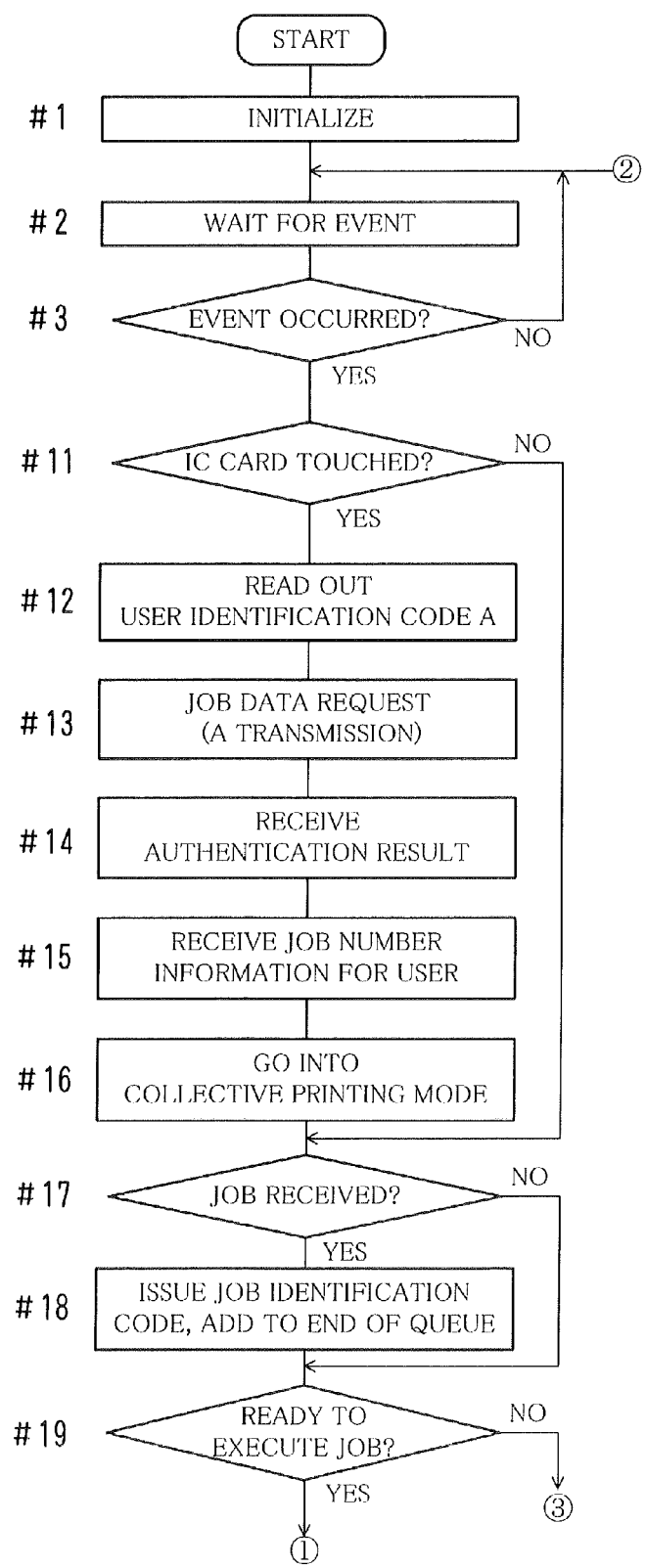
FIG. 7 is a flowchart for depicting an example of the flow of the overall processing performed by an image forming apparatus.
Figure 8:
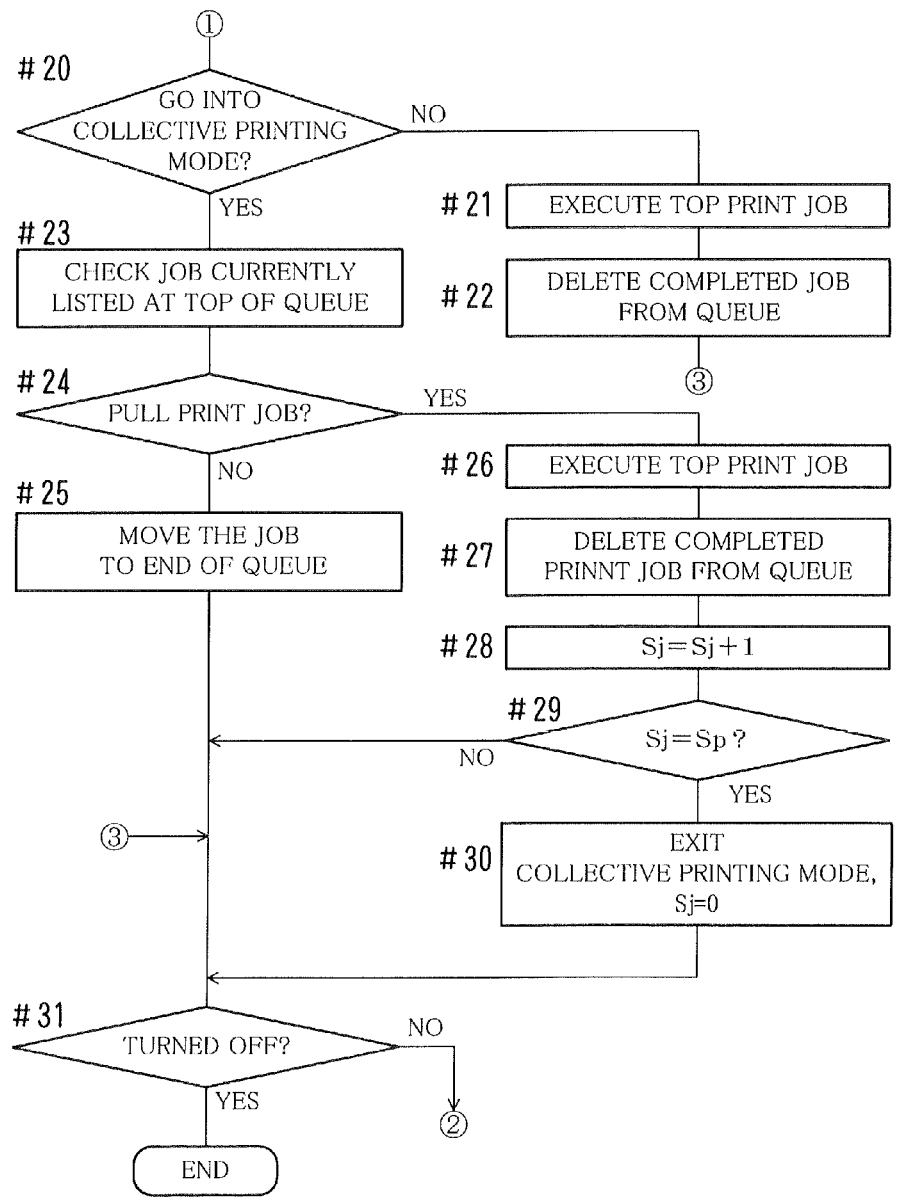
FIG. 8 is a flowchart for depicting an example of the flow of the overall processing performed by an image forming apparatus.

FIGS. 7 and 8 are flowcharts for depicting an example of the flow of the overall processing performed by the image forming apparatus 1.

The description goes on to the flow of print job-related processing performed by the image forming apparatus 1 with reference to the flowcharts of FIGS. 7 and 8.

When being turned ON, the image forming apparatus 1 performs initialization processing, e.g., setting the executed job number Sj at "0" (Step #1 of FIG. 7). The image forming apparatus 1 waits for an event to occur (Step #2). The event is, for example, receiving data from another device, receiving operation made by a user, or completing the active print job. When such an event occurs (Yes in Step #3), the image forming apparatus 1 performs processing as described below depending on the event.

When the user brings the IC card 50 into contact with the card reader 10j (Yes in Step #11), the image forming apparatus 1 reads out a user identification code 5S from the IC card 50 (Step #12), and sends job request data 6F indicating the user identification code 5S to the server 2 (Step #13). In this way, the server 2 is requested to send job data of the user corresponding to the user identification code 5S. The server 2 performs user authentication based on the job request data 6F.

The image forming apparatus 1 receives user authentication result data 6G from the server 2 (Step #14). When the user is successfully authenticated, the image forming apparatus 1 receives job number data 6H (Step #15), and goes into the collective printing mode (Step #16).

When receiving print job data from the server 2 or the terminal 3 (Yes in Step #17), the image forming apparatus 1 issues a job identification code 5J for the print job to add the job identification code 5J to the bottom of the queue data 6Q, and associates the received data with the job identification code 5J to store the resultant into the job data storage portion 107 (Step #18).

When being ready to start a print job (Yes in Step #19), and when being not placed in the collective printing mode (No in Step #20 of FIG. 8), the image forming apparatus 1 executes a print job corresponding to the job identification code 5J listed at the top of the queue data 6Q regardless of the type of the print job (Step #21), and deletes the job identification code 5J from the queue data 6Q (Step #22). In contrast, when being placed in the collective printing mode (Yes in Step #20), the image forming apparatus 1 executes a print job in the following manner.

To be specific, the image forming apparatus 1 checks whether or not the print job corresponding to the job identification code 5J currently listed at the top of the queue data 6Q is a pull print job, and whether or not that print job is a job instructed by the logged-in user (Step #23). If that print job is not a pull print job (No in Step #24), or, if that print job is not a job instructed by the logged-in user (No in Step #24), then the job identification code 5J is moved to the bottom of the queue data 6Q (Step #25). On the other hand, if that print job is a pull print job, and is a job instructed by the logged-in user (Yes in Step #24), then the image forming apparatus 1 executes the print job (Step #26). The image forming apparatus 1 then deletes the job identification code 5J corresponding to the print job from the queue data 6Q (Step #27), and adds "1" to the executed job number Sj (Step #28). At a time when the executed job number Sj reaches the pull print job number Sp (Yes in Step #29), the image forming apparatus 1 turns the collective printing mode from ON to OFF, and resets the executed job number Sj at "0" (Step #30).

While the image forming apparatus 1 is turned ON (No in Step #31), after the completion of the processing corresponding to the event, the process goes back to Step #2 (FIG. 7) in which the image forming apparatus 1 waits for a new event to occur.

Figure 9:
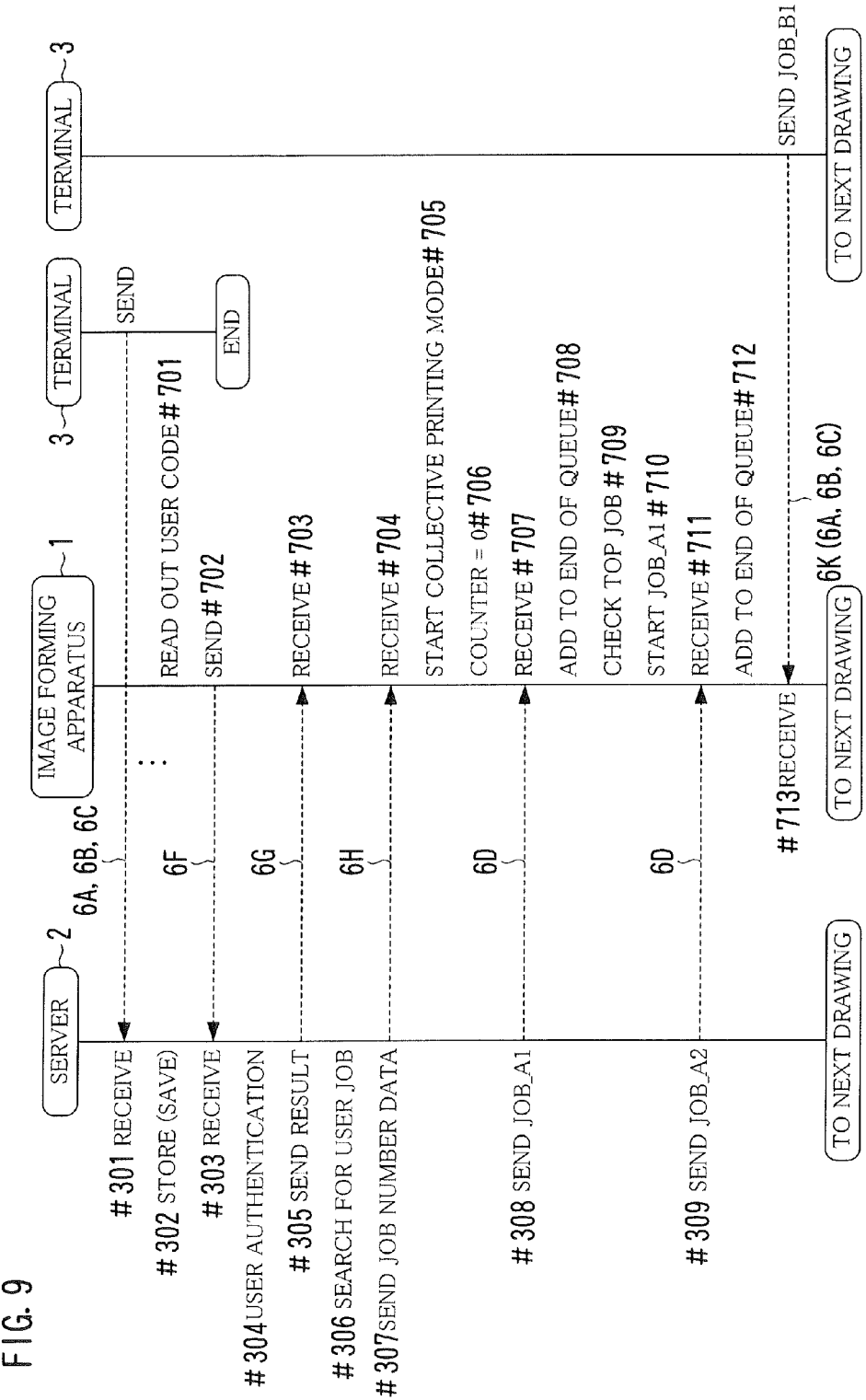
FIG. 9 is a sequence diagram for depicting an example of the flow of the processing performed by devices in a network printing system.
Figure 10:
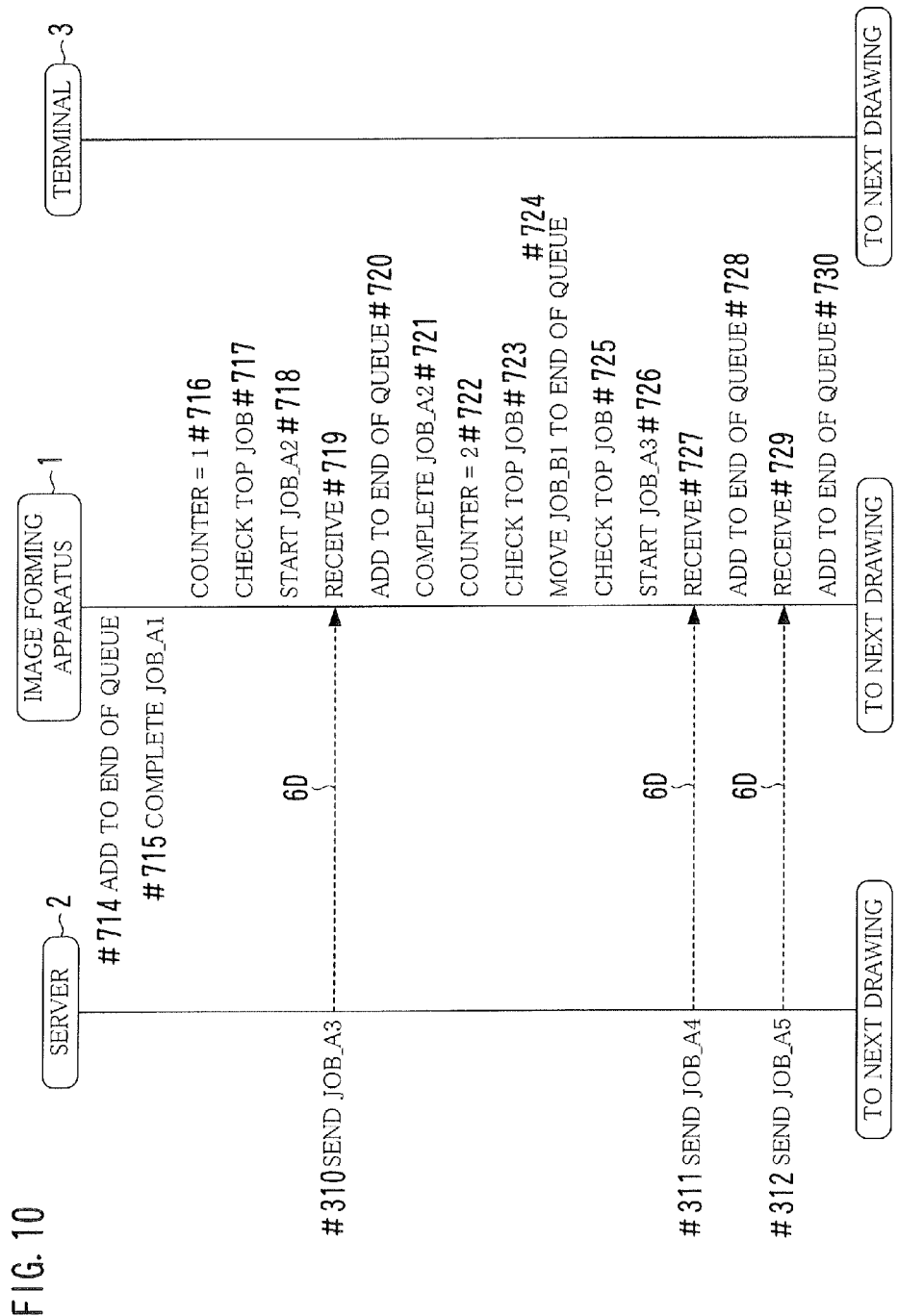
FIG. 10 is a sequence diagram for depicting an example of the flow of the processing performed by devices in a network printing system.
Figure 11:
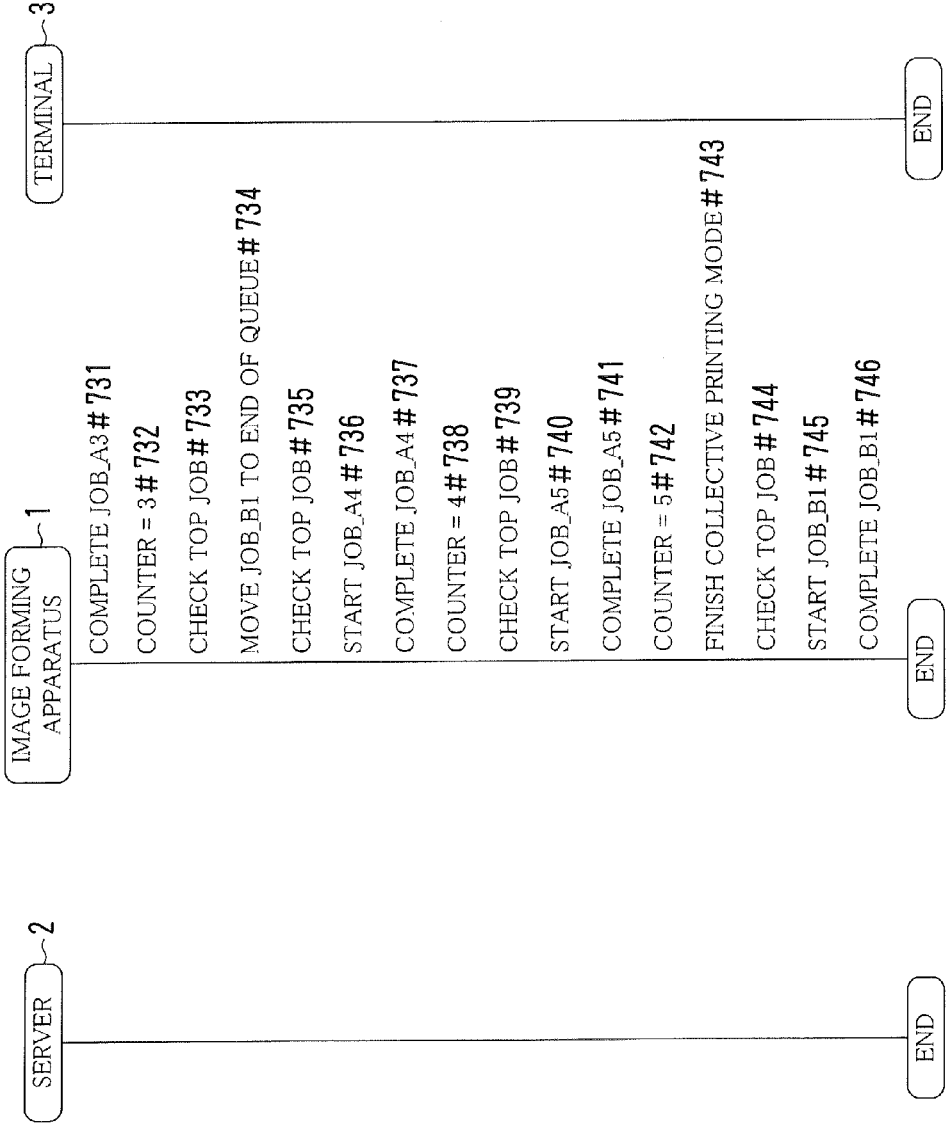
FIG. 11 is a sequence diagram for depicting an example of the flow of the processing performed by devices in a network printing system.
Figure 12:
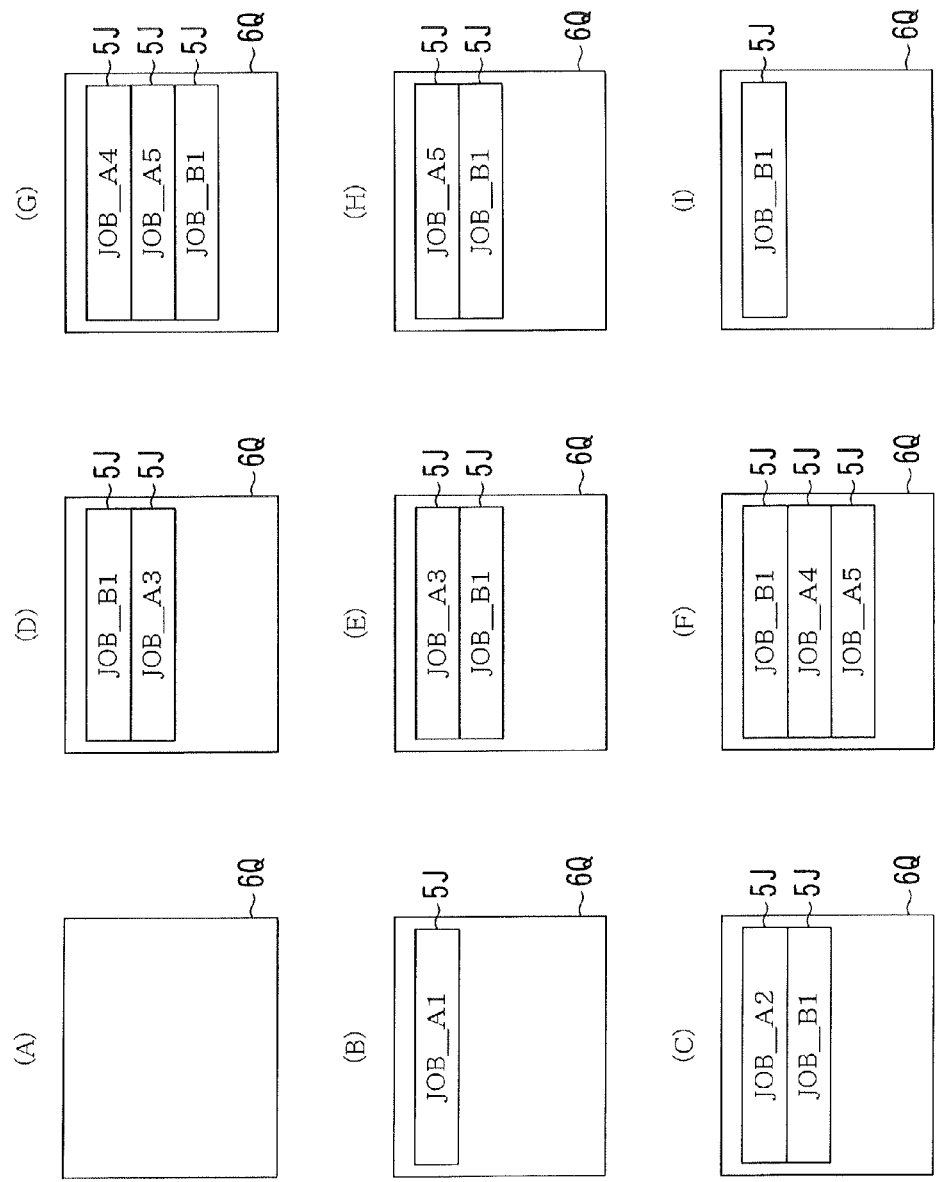
FIG. 12 is a diagram showing an example of a transition of queue data.

FIGS. 9-11 are sequence diagrams for depicting an example of the flow of the processing performed by the devices in the network printing system 1NP. FIG. 12 is a diagram showing an example of a transition of the queue data 6Q.

The description goes on to an example of the flow of processing performed by the devices of the network printing system 1NP for a case where a user A gives a plurality of pull print job commands with reference to the sequence diagrams of FIGS. 9-11 and so on.

The user A prepares, in advance, a plurality of sets of data for documents in the terminal 3, and enters a print job command for each of the documents into the terminal 3. In response to the operation, the terminal 3 generates print data 6A for each of the documents and so on, and sends the same to the server 2.

Referring to FIGS. 9-11, when receiving the print data 6A and so on (Step #301), the server 2 generates pull print job data 6D which contains the print data 6A and so on, and stores the pull print job data 6D into the job data storage portion 206 (Step #302). Assume that, for example, the user A prepares five documents. In such a case, the processing from Step #301 and Step #302 is performed five times, so that five sets of the pull print job data 6D are stored into the job data storage portion 206. In some cases, before the pull print job data 6D for the user A is stored, the job data storage portion 206 stores therein pull print job data 6D for other users.

The user A goes to the installation site of the image forming apparatus 1, and brings his/her IC card 50 into contact with the card reader 10j. In response to this operation, the image forming apparatus 1 reads out a user identification code 5S of the user A from the IC card 50 (Step #701), and sends job request data 6F indicating the user identification code 5S to the server 2 (Step #702).

Upon the receipt of the job request data 6F (Step #303), the server 2 performs user authentication (Step #304), and sends user authentication result data 6G showing the result thereof to the image forming apparatus 1 (Step #305). The image forming apparatus 1 receives the user authentication result data 6G (Step #703).

When the user A is successfully authenticated, the server 2 searches for pull print job data 6D indicating the user identification code 5S shown in the job request data 6F, i.e., pull print job data 6D for the user A (Step #306), and sends job number data 6H showing the number of sets of pull print job data 6D found out by the search to the image forming apparatus 1 (Step #307).

Upon the receipt of the job number data 6H (Step #704), the image forming apparatus 1 goes into the collective printing mode (Step #705), and resets the executed job number Sj of the counter at zero (Step #706).

After sending the job number data 6H, the server 2 sends the sets of pull print job data 6D for the user A one by one to the image forming apparatus 1 (Step #308 through Step #312).

Each time when receiving the pull print job data 6D (Step #707, Step #711, Step #719, Step #727, or Step #729), the image forming apparatus 1 issues a new job identification code 5J to add the new job identification code 5J to the bottom of the queue data 6Q, and associates the received pull print job data 6D with the new job identification code 5J to store the resultant into the job data storage portion 107 (Step #708, Step #712, Step #720, Step #728, or Step #730).

The image forming apparatus 1 sometimes receives, from the terminal 3, data such as print data 6A for direct print job (Step #713). In such a case, the image forming apparatus 1 issues a new job identification code 5J to add the new job identification code 5J to the bottom of the queue data 6Q, incorporates the received data into the direct print job data 6K, and associates the direct print job data 6K with the new job identification code 5J to store the resultant into the job data storage portion 107 (Step #714).

Hereinafter, the processing for adding a job identification code 5J to the queue data 6Q to store job data into the job data storage portion 107 is referred to as "registration processing".

According to the illustrated example of FIGS. 9-11, job_A1 through job_A5, which are pull print jobs instructed by the user A, and job_B1, which is a direct print job instructed by a user B, are sent to the image forming apparatus 1 in the order of job_A1, job_A2, job_B1, job_A3, job_A4, and job_A5. In Step #707 at which data on job_A1 is received, no job identification code 5J is contained in the queue data 6Q as shown in (A) of FIG. 12.

After the registration processing of job_A1 is completed, the image forming apparatus 1 checks the job identification code 5J listed at the top of the queue data 6Q (Step #709). As shown in (B) of FIG. 12, the top job identification code 5J corresponds to job_A1, namely, a pull print job instructed by the user A who is the logged-in user. The image forming apparatus 1 starts job_A1 accordingly (Step #710). In relation to the start of job_A1, the job identification code 5J of job_A1 is deleted from the queue data 6Q. Likewise, job identification codes 5J of the other jobs are also deleted in a similar time.

While executing job_A1, the image forming apparatus 1 receives data on job_A2 and data on job_B1, and performs the registration processing for both the jobs (Step #711 through Step #714). Thereby, as shown in (C) of FIG. 12, the job identification codes 5J of job_A2 and job_B1 are added to the queue data 6Q.

When completing job_A1 (Step #715), the image forming apparatus 1 adds "1" to the executed job number Sj (Step #716). In relation to the completion of job_A1, the pull print job data 6D for job_A1 is deleted from the job data storage portion 107. Likewise, job data for the other jobs are also deleted in a similar time.

The image forming apparatus 1 checks the job identification code 5J listed at the top of the queue data 6Q (Step #717). As shown in (C) of FIG. 12, the top job identification code 5J corresponds to job_A2, namely, a pull print job instructed by the user A who is the logged-in user. The image forming apparatus 1 starts job_A2 accordingly (Step #718).

While executing job_A2, the image forming apparatus 1 receives data on job_A3, and performs the registration processing for job_A3 (Step #719 and Step #720). Thereby, the job identification code 5J of job_A3 is added to the queue data 6Q as shown in (D) of FIG. 12.

When completing job_A2 (Step #721), the image forming apparatus 1 adds "1" to the executed job number Sj (Step #722). The image forming apparatus 1 then checks the job identification code 5J listed at the top of the queue data 6Q (Step #723). As shown in (D) of FIG. 12, the top job identification code 5J corresponds to job_B1, namely, a job instructed by the user B. The image forming apparatus 1 moves the job identification code 5J to the last of the queue data 6Q as shown in (E) of FIG. 12 (Step #724). The image forming apparatus 1 checks the job identification code 5J listed at the top of the queue data 6Q (Step #725). The top job identification code 5J corresponds to job_A3, namely, a pull print job instructed by the user A who is the logged-in user. The image forming apparatus 1 starts job_A3 accordingly (Step #726).

While executing job_A3, the image forming apparatus 1 receives data on job_A4 and data on job_A5, and performs the registration processing for both the jobs (Step #727 through Step #730). Thereby, the job identification codes 5J of job_A4 and job_A5 are added to the queue data 6Q as shown in (F) of FIG. 12.

When completing job_A3 (Step #731), the image forming apparatus 1 adds "1" to the executed job number Sj (Step #732). The image forming apparatus 1 then checks the job identification code 5J listed at the top of the queue data 6Q (Step #733). As shown in (F) of FIG. 12, the top job identification code 5J corresponds to job_B1, namely, a job instructed by the user B. Accordingly, the image forming apparatus 1 moves the job identification code 5J to the last of the queue data 6Q as shown in (G) of FIG. 12 (Step #734). The image forming apparatus 1 then checks the job identification code 5J listed at the top of the queue data 6Q (Step #735). The top job identification code 5J corresponds to job_A4, namely, a pull print job instructed by the user A who is the logged-in user. The image forming apparatus 1 starts job_A4 accordingly (Step #736).

When completing job_A4 (Step #737), the image forming apparatus 1 adds "1" to the executed job number Sj (Step #738). The image forming apparatus 1 then checks the job identification code 5J listed at the top of the queue data 6Q (Step #739). As shown in (H) of FIG. 12, the top job identification code 5J corresponds to job_A5, namely, a pull print job instructed by the user A who is the logged-in user. The image forming apparatus 1 starts job_A5 accordingly (Step #740).

When completing job_A5 (Step #741), the image forming apparatus 1 adds "1" to the executed job number Sj (Step #742). Thereby, the executed job number Sj reaches the pull print job number Sp. Accordingly, the image forming apparatus 1 exits the collective printing mode (Step #743).

Since the image forming apparatus 1 exits the collective printing mode, the image forming apparatus 1 executes, in accordance with the rule, print jobs in the order starting from the print job corresponding to the top job identification code 5J in the queue data 6Q. In this example, the job identification code 5J of job_B1 is listed at the top of the queue data 6Q as shown in (I) of FIG. 12, the image forming apparatus 1 executes job_B1 (Step #744 through Step #746).

According to the first embodiment, it is possible to prevent desired printed matters produced based on print jobs instructed by a specific user from mixing with another printed matter produced based on a print job instructed by another user.

Second Embodiment

Figure 13:
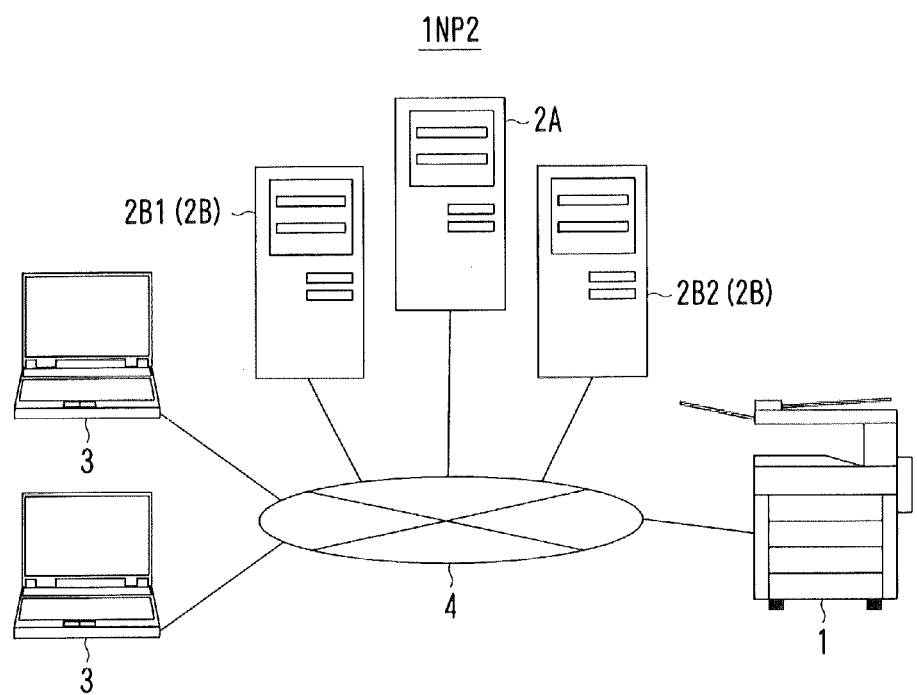
FIG. 13 is a diagram showing an example of the overall configuration of a network printing system.
Figure 14:
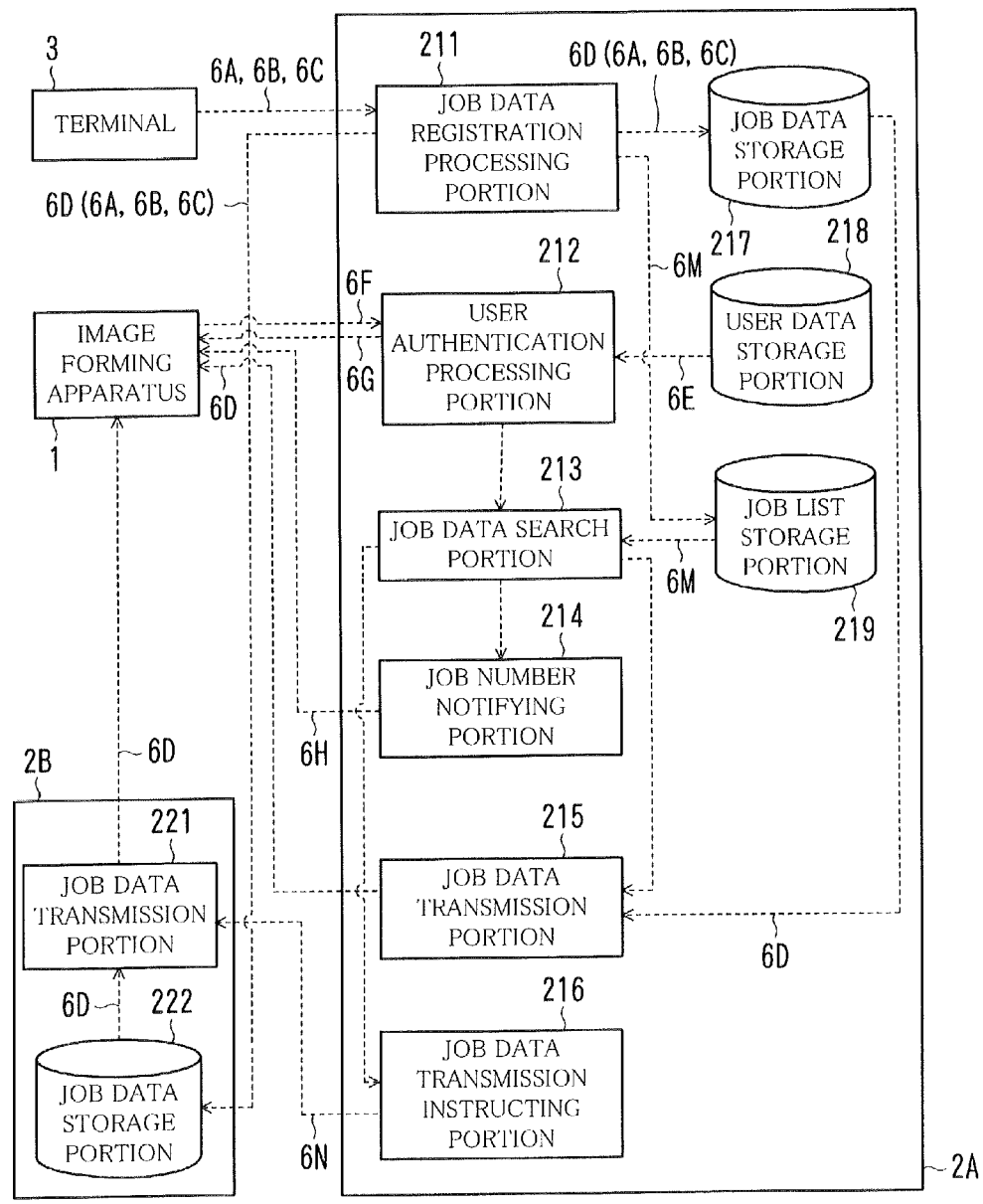
FIG. 14 is a diagram showing an example of the functional configurations of a host server and a slave server.
Figure 16:
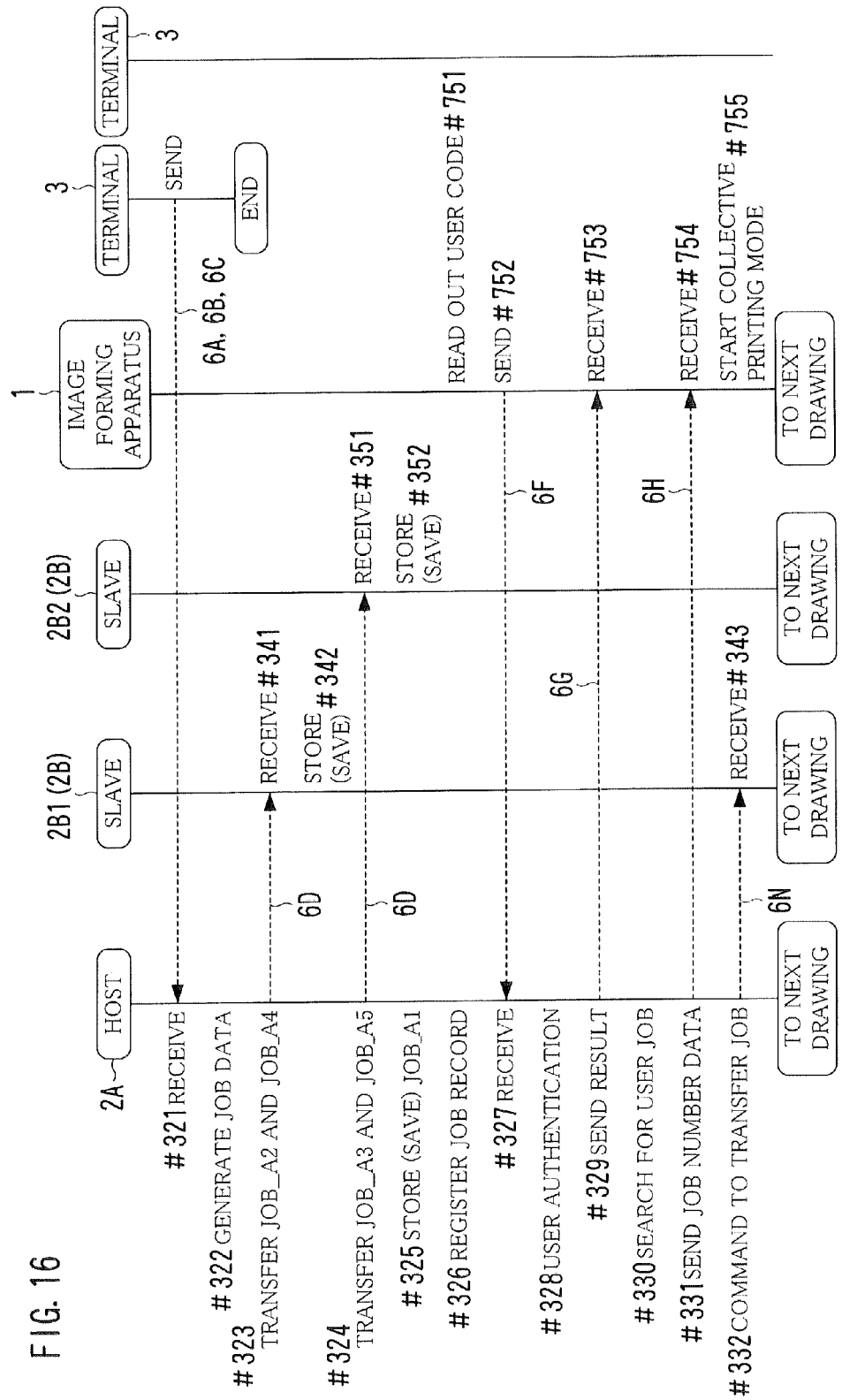
FIG. 16 is a sequence diagram for depicting an example of the flow of the processing performed by devices in a network printing system.
Figure 17:
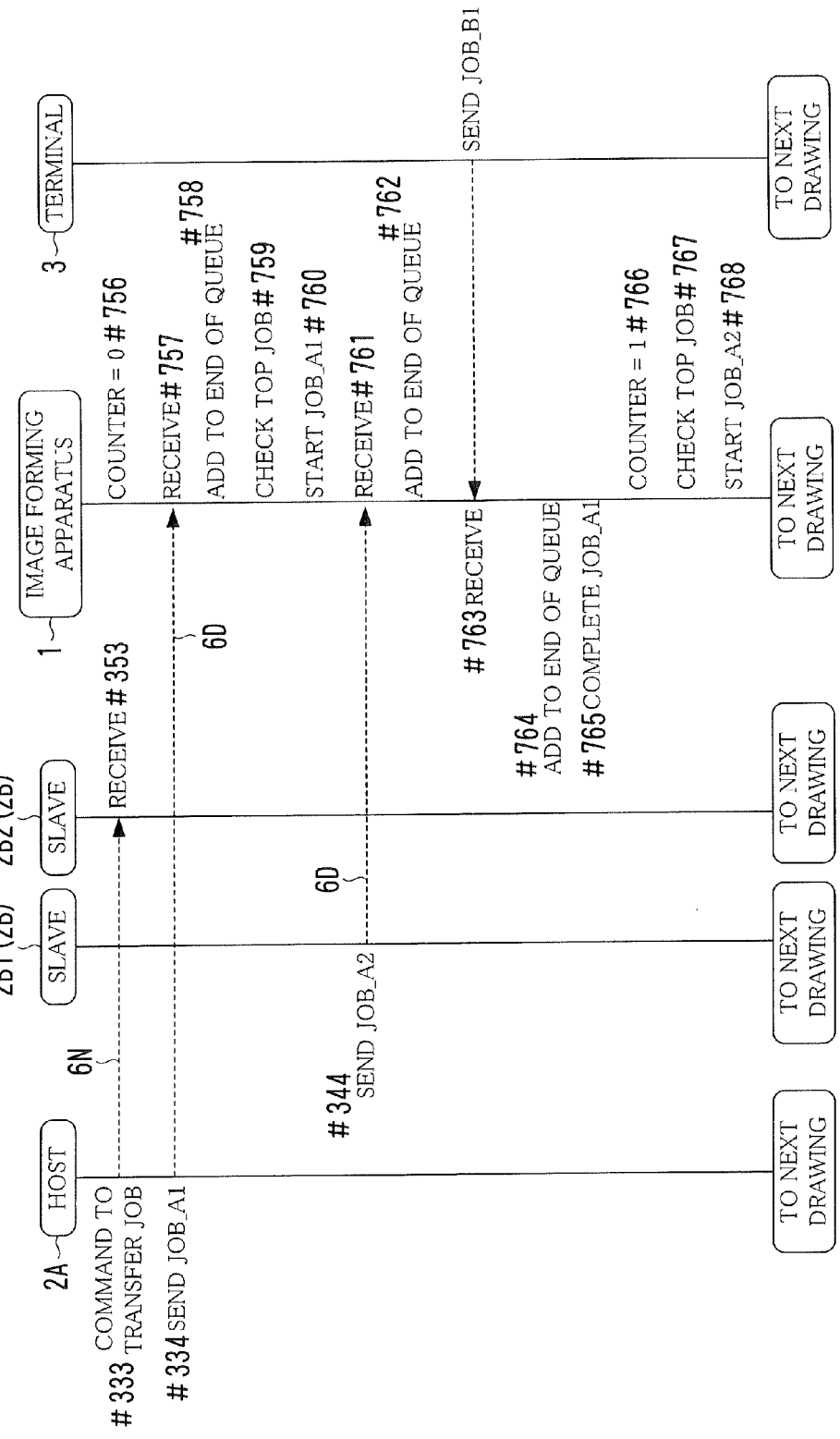
FIG. 17 is a sequence diagram for depicting an example of the flow of the processing performed by devices in a network printing system.
Figure 18:
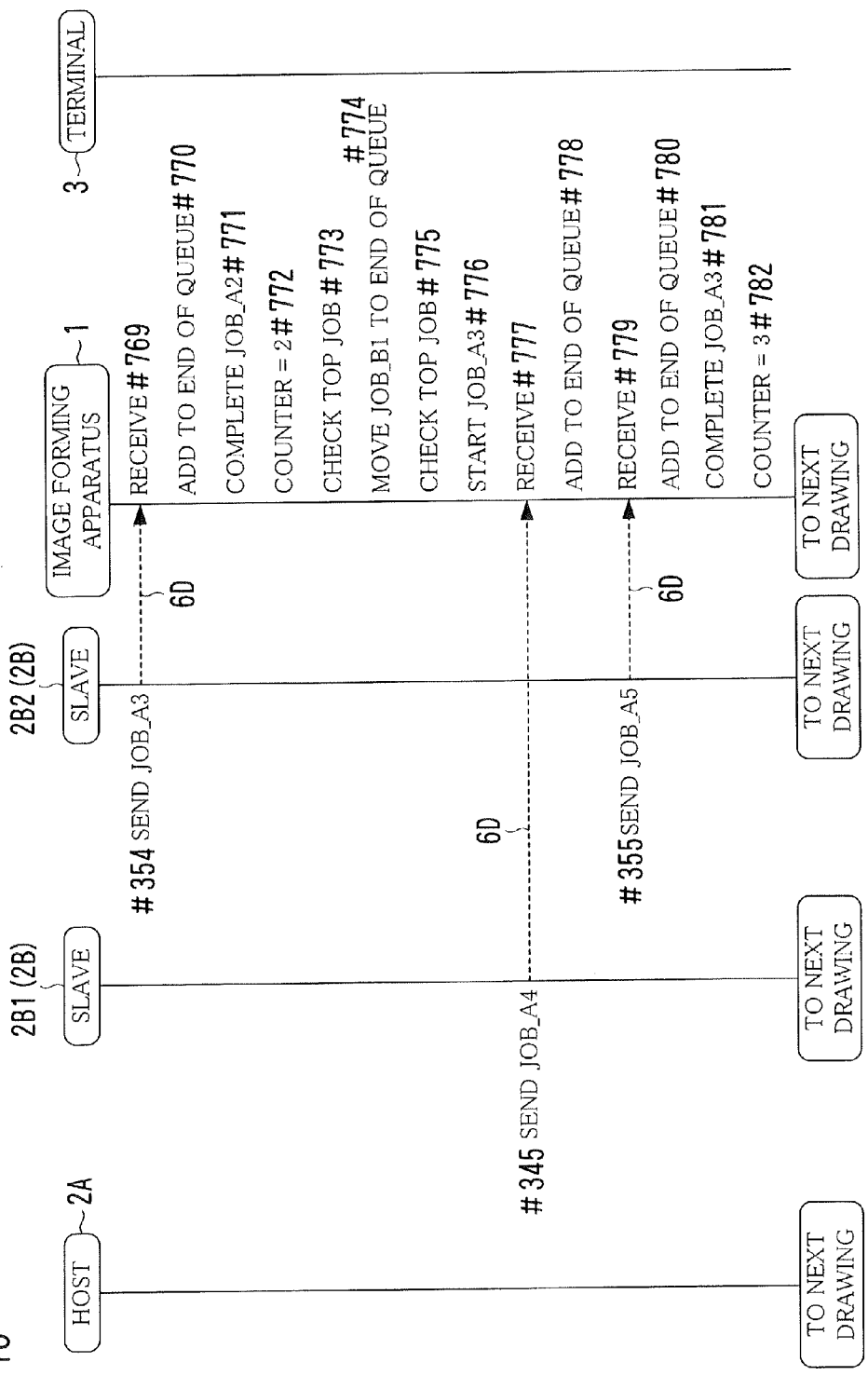
FIG. 18 is a sequence diagram for depicting an example of the flow of the processing performed by devices in a network printing system.
Figure 19:
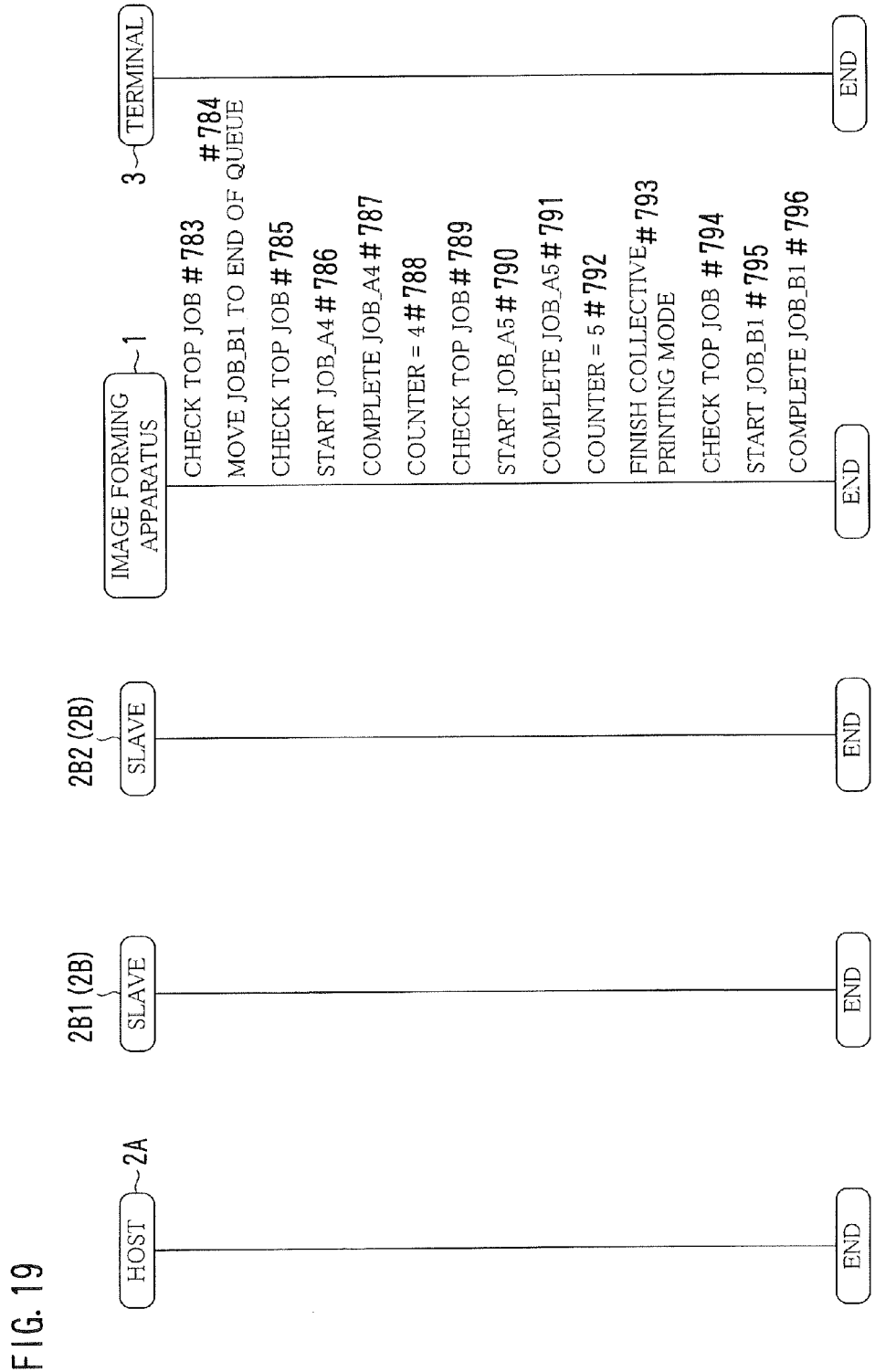
FIG. 19 is a sequence diagram for depicting an example of the flow of the processing performed by devices in a network printing system.

FIG. 13 is a diagram showing an example of the overall configuration of a network printing system 1NP2; FIG. 14 is a diagram showing an example of the functional configurations of a host server 2A and a slave server 2B; and FIG. 15 is a diagram showing an example of job management records 6M.

In the first embodiment, a plurality of sets of pull print job data 6D is stored into one server 2. In contrast, in the second embodiment, a plurality of sets of pull print job data 6D is distributed among a plurality of servers for storage.

Referring to FIG. 13, the network printing system 1NP2 is configured of the image forming apparatus 1, the host server 2A, the slave servers 2B, the terminals 3, the communication line 4, and so on.

The role by the image forming apparatus 1 and the role by the terminals 3 are the same as those in the first embodiment. The hardware configuration of the image forming apparatus 1 is the same as that in the first embodiment as shown in FIG. 2.

The roles by the host server 2A and the slave servers 2B are similar to that by the server 2 in the first embodiment in that the host server 2A and the slave servers 2B store the pull print job data 6D, and deliver the pull print job data 6D to the image forming apparatus 1. The hardware configurations of the host server 2A and the slave servers 2B are the same as that of the server 2 in the first embodiment as shown in FIG. 4.

In the second embodiment, the functions of the server are distributed into the host server 2A and the slave servers 2B as discussed below.

The host server 2A receives, from the terminal 3, a set of print data 6A, conditions data 6B, and user identification data 6C, and brings the set of data together to generate one set of pull print job data 6D. The host server 2A stores the pull print job data 6D therein. Alternatively, the host server 2A transfers the pull print job data 6D to the slave server 2B and to cause the same to store the pull print job data 6D. The host server 2A also manages information on storage locations of the individual sets of pull print job data 6D. In response to a request from the image forming apparatus 1, the host server 2A transmits the pull print job data 6D, or, instructs the slave server 2B to transmit the pull print job data 6D.

In accordance with the instructions from the host server 2A, the slave server 2B stores the pull print job data 6D, and sends the pull print job data 6D to the image forming apparatus 1.

With the host server 2A, the ROM or the large-capacity storage stores, therein, software for implementing a job data registration processing portion 211, a user authentication processing portion 212, a job data search portion 213, a job number notifying portion 214, a job data transmission portion 215, a job data transmission instructing portion 216, a job data storage portion 217, a user data storage portion 218, a job list storage portion 219, and so on, all of which are shown in FIG. 14.

With the slave server 2B, the ROM or the large-capacity storage of stores, therein, software for implementing a job data transmission portion 221, a job data storage portion 222, and so on.

The following is a description of print job processing performed by the image forming apparatus 1, the individual portions of the host server 2A and of the slave server 2B shown in FIG. 14, and the terminal 3. Description of points common to the first embodiment shall be omitted.

The functional configuration of the image forming apparatus 1 is basically the same as that in the first embodiment as shown in FIG. 3. However, the job data obtaining portion 101 sends the job request data 6F to the host server 2A. Further, the job data obtaining portion 101 receives the job number data 6H only from the host server 2A, and receives a pull print job from the host server 2A in some cases and receives a pull print job from the slave server 2B in other cases.

As with the job data registration processing portion 201 (see FIG. 5) of the first embodiment, the job data registration processing portion 211 of the host server 2A receives the print data 6A, the conditions data 6B, and the user identification data 6C from the terminal 3, and combines the received data to generate one set of pull print job data 6D to store the resultant into a storage portion. In the second embodiment, however, the pull print job data 6D is distributed among the host server 2A and the slave server 2B as described above.

Accordingly, when generating the pull print job data 6D, the job data registration processing portion 211 determines which server is to store the generated pull print job data 6D. Suppose that, for example, the network printing system 1NP2 includes two slave servers 2B1 and 2B2 as the slave servers 2B. In such a case, the job data registration processing portion 211 may choose any one of the host server 2A, the slave server 2B1, and the slave server 2B2 at random, and determine the server chosen to be the storage destination of the pull print job data 6D. The job data registration processing portion 211 may determine the host server 2A to be the storage destination of the (3x−2)-th pull print job data 6D, the slave server 2B1 to be the storage destination of the (3x−1)-th pull print job data 6D, and the slave server 2B2 to be the storage destination of the 3x-th pull print job data 6D. Note that "x" herein is a natural number.

When the host server 2A is determined to be the storage destination of the pull print job data 6D, the job data registration processing portion 211 stores the pull print job data 6D into the job data storage portion 217 of the host server 2A itself. On the other hand, when either one of the slave servers 2B is determined to be the storage destination of the pull print job data 6D, the job data registration processing portion 211 transfers the pull print job data 6D to the slave server 2B thus determined.

When the job data registration processing portion 211 executes the processing for storing the pull print job data 6D, a job management record 6M indicating an identifier of the pull print job data 6D (file name, for example), user identification code 5S, and an identifier of the storage destination server (IP address, for example) is stored into the job list storage portion 219. The processing by the job data registration processing portion 211 is performed a plurality of times as described above, so that job management records 6M are accumulated in the job list storage portion 219 as shown in FIG. 15. The user identification code 5S is one indicated in the job request data 6F. Hereinafter, an identifier of job data such as the pull print job data 6D is referred to as a "file name 5F". An identifier of a device such as a server or an image forming apparatus is refereed to as a "device identifier 5D". The file name 5F is unique to each print job. Accordingly, the file name 5F may be used also as a print job identifier.

The user authentication processing portion 212 and the user data storage portion 218 have functions similar to those of the user authentication processing portion 202 and the user data storage portion 207 of the first embodiment respectively.

The job data search portion 213 plays the same role as that of the job data search portion 203 of the first embodiment. To be specific, when the job request data 6F is received, and when the user is successfully authenticated by the user authentication processing portion 212, the job data search portion 213 searches for pull print job data 6D indicating the user identification code 5S shown in the job request data 6F. However, the job data search portion 213 makes the search based on the job management records 6M stored in the job list storage portion 219. Stated differently, the job data search portion 213 searches for the job management record 6M indicating the user identification code 5S in order to find out the pull print job data 6D.

As with the job number notifying portion 204 of the first embodiment, the job number notifying portion 214 transmits the job number data 6H to the image forming apparatus 1. In short, the job number notifying portion 214 transmits data indicating the number of sets of the pull print job data 6D found out by the search by the job data search portion 213.

The job data transmission portion 215 sends, among the plurality of sets of pull print job data 6D found out by the search by the job data search portion 213, pull print job data 6D stored in the job data storage portion 217 of the host server 2A to the image forming apparatus 1.

The job data transmission instructing portion 216 instructs the slave server 2B to send, to the image forming apparatus 1, the pull print job data 6D stored in the slave server 2B and found out by the job data search portion 213. At this time, the job data transmission instructing portion 216 sends, to the slave server 2B, transmission command data 6N indicating the file name 5F of the pull print job data 6D stored in the slave server 2B and the device identifier 5D of the image forming apparatus 1.

Which server stores such pull print job data 6D found out through the search by the job data search portion 213 is known by referring to the job management record 6M of the pull print job data 6D. After the pull print job data 6D is sent to the image forming apparatus 1, the job management record 6M of the pull print job data 6D is deleted from the job list storage portion 219.

With the slave server 2B, the job data storage portion 222 stores, therein, the pull print job data 6D transferred from the host server 2A.

The job data transmission portion 221 sends the pull print job data 6D to the image forming apparatus 1 based on the transmission command data 6N sent by the host server 2A. To be specific, the job data transmission portion 221 retrieves pull print job data 6D corresponding to the file name 5F indicated in the transmission command data 6N from the job data storage portion 222, and sends the retrieved pull print job data 6D to a device corresponding to the device identifier 5D indicated in the transmission command data 6N.

FIGS. 16-19 are sequence diagrams for depicting an example of the flow of the processing performed by the devices in the network printing system 1NP2.

The description goes on to an example of the flow of processing performed by the devices of the network printing system 1NP2 for a case where a user A gives pull print job commands with reference to the sequence diagrams of FIGS. 16-19 and so on. Descriptions of parts that are identical with those in FIGS. 9-11 shall be omitted.

The terminal 3 sends data on each document prepared by the user A (print data 6A, conditions data 6B, and user identification data 6C) to the host server 2A.

Referring to FIGS. 16-19, when receiving the data on each document (Step #321), the host server 2A generates pull print job data 6D for each document (Step #322). The host server 2A transfers some sets of pull print job data 6D to the slave server 2B (Step #323 and Step #324), and stores the other sets of pull print job data 6D into the job data storage portion 217 of the host server 2A itself (Step #325). In the example of FIGS. 16-19, out of the five jobs from job_A1 through job_A5, the host server 2A stores the pull print job data 6D for job_A1 into the job data storage portion 217 of the host server 2A itself (Step #325), transfers the pull print job data 6D for job_A2 and the pull print job data 6D for job_A4 to the slave server 2B1 (Step #323), and transfers the pull print job data 6D for job_A3 and the pull print job data 6D for job_A5 to the slave server 2B2 (Step #324).

Each of the slave servers 2B receives the pull print job data 6D (Step #341 or Step #351), and stores the same into the job data storage portion 222 of the slave server 2 concerned (Step #342 or Step #352).

As with the first embodiment, the user A goes to the installation site of the image forming apparatus 1, and brings his/her IC card 50 into contact with the card reader 10j. In response to this operation, the image forming apparatus 1 reads out a user identification code 5S of the user A from the IC card 50 (Step #751), and sends job request data 6F indicating the user identification code 5S to the host server 2A (Step #752).

Upon the receipt of the job request data 6F (Step #327), the host server 2A performs user authentication (Step #328), and sends user authentication result data 6G to the image forming apparatus 1 (Step #329). The image forming apparatus 1 receives the user authentication result data 6G (Step #753).

When the user A is successfully authenticated, the host server 2A searches for pull print job data 6D for the user A (Step #330), and sends job number data 6H showing the number of sets of pull print job data 6D to the image forming apparatus 1 (Step #331).

Upon the receipt of the job number data 6H (Step #754), the image forming apparatus 1 goes into the collective printing mode (Step #755), and resets the executed job number Sj of the counter at zero (Step #756).

After sending the job number data 6H, the host server 2A sends the sets of pull print job data 6D for the user A one by one to the image forming apparatus 1 (Step #334). In parallel with the transmission of the print job data 6D or before or after the same, the host server 2A sends, to the other servers storing the rest of the pull print job data 6D for the user A, i.e., the slave servers 2B1 and 2B2 in this example, the transmission command data 6N, and thereby, instructs the slave servers 2B1 and 2B2 to send the pull print job data 6D stored therein to the image forming apparatus 1 (Step #332 and Step #333).

When receiving the transmission command data 6N (Step #343 or Step #353), each of the slave servers 2B sends the sets of pull print job data 6D corresponding to the file names 5F indicated in the transmission command data 6N one by one to the image forming apparatus 1 (Step #344 and Step #345, or, Step #354 and Step #355).

The image forming apparatus 1 receives the sets of pull print job data 6D from each of the host server 2A, the slave server 2B1, and the salve server 2B2 (Step #757, Step #761, Step #769, Step #777, and Step #779). The image forming apparatus 1 sometimes receives job data for direct printing from the terminal 3 (Step #763). The contents of processing performed after the job data is received are the same as those of the first embodiment.

In the example of FIGS. 16-19, a time at which the image forming apparatus 1 receives each of job_A1 through job_A5, and job_B1 is similar to that shown in FIGS. 9-11 of the first embodiment. The process in Step #757 and beyond is the same as that in Step #707 and beyond of the first embodiment.

The flow of the overall processing by the image forming apparatus 1 is basically the same as that of the first embodiment as described with reference to FIGS. 7 and 8.

According to the second embodiment, even when a plurality of sets of pull print job data is distributed among a plurality of servers and managed therein, it is possible to prevent desired printed matters produced based on print jobs instructed by a specific user from mixing with another printed matter produced based on a print job instructed by another user.

Third Embodiment

Figure 20:
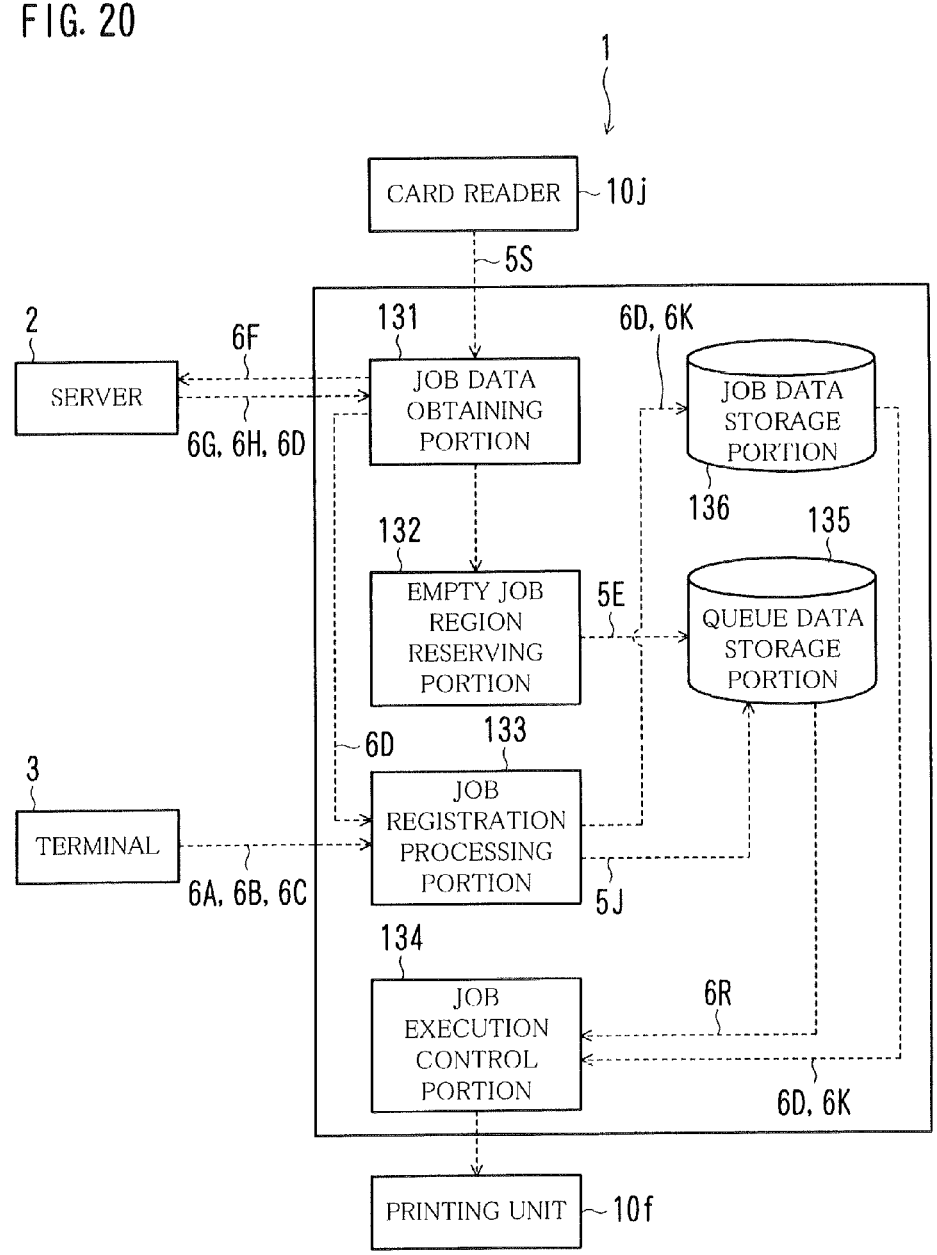
FIG. 20 is a diagram showing an example of the functional configuration of an image forming apparatus.
Figure 21:
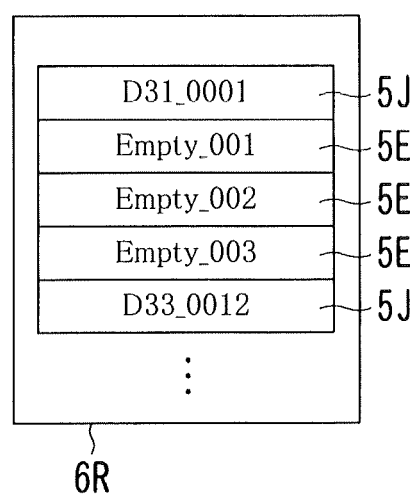
FIG. 21 is a diagram showing an example of queue data.
Figure 22A:
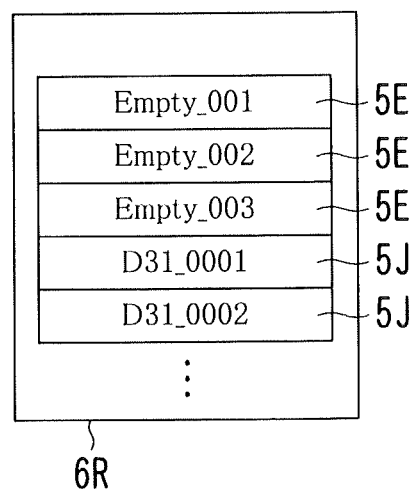
FIGS. 22A and 22B are diagrams for depicting examples as to how to add an empty job region code to queue data.
Figure 22B:
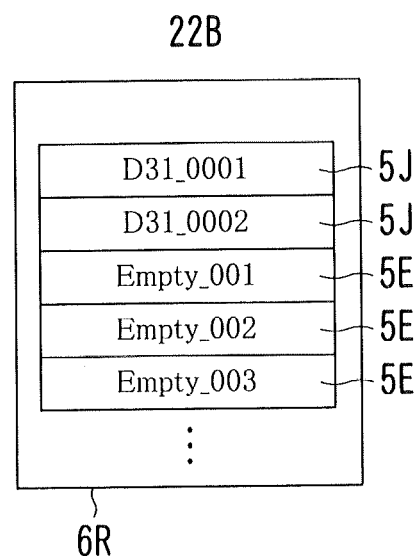

FIG. 20 is a diagram showing an example of the functional configuration of the image forming apparatus 1; FIG. 21 is a diagram showing an example of queue data 6R; and FIGS. 22A and 22B are diagrams for depicting examples as to how to add an empty job region code 5E to queue data.

In the first and second embodiments, when the turn of a job other than pull print jobs instructed by the logged-in user comes, the job data is moved to the bottom of the queue data so that the job is to be executed the last. According to the third embodiment, pull print jobs instructed by the logged-in user are grouped and the order that such pull print jobs are to be executed is preassigned. In short, the order of execution of such pull print jobs is reserved.

The overall configuration of the network printing system 1NP in the third embodiment is similar to that in the first embodiment as shown in FIG. 1.

The configuration and the processing contents of each of the server 2 and the terminal 3 are similar to those in the first embodiment. To be specific, the server 2 is configured of the hardware shown in FIG. 4, and has the functional configuration shown in FIG. 5. The terminal 3 sends print data 6A of a document, conditions data 6B, and user identification data 6C to the server 2 or the image forming apparatus 1.

The role played by the image forming apparatus 1 is similar to that in the first embodiment. However, how to handle the queue data is different between the first embodiment and the third embodiment. The below description focuses on the handling of the queue data.

The hardware configuration of the image forming apparatus 1 is similar to that in the first embodiment as shown in FIG. 2. The ROM or the large-capacity storage has installed therein software for implementing the functions of a job data obtaining portion 131, an empty job region reserving portion 132, a job registration processing portion 133, a job execution control portion 134, a queue data storage portion 135, a job data storage portion 136, and so on, all of which are shown in FIG. 20.

The description goes on to print job processing performed by the individual portions of the image forming apparatus 1 shown in FIG. 20, the server 2, and the terminal 3. Descriptions of parts that are identical with those in the first embodiment shall be omitted.

The queue data storage portion 135 stores queue data 6R therein. As with the queue data 6Q (see FIG. 6) of the first embodiment, the queue data 6R indicates job identification codes 5J of jobs in queue. The queue data 6R sometimes indicates empty job region codes 5E in addition to the job identification codes 5J, as shown in FIG. 21.

The empty job region code 5E is a code of temporary (dummy) execution order of a job. The empty job region code 5E is later replaced with a job identification code 5J of a pull print job as described later.

No job identification codes 5J and no empty job region codes 5E are indicated in the queue data 6R at the beginning. As described later, the job identification codes 5J and the empty job region codes 5E are added to the queue data 6Q in order.

As with the job data obtaining portion 101 (see FIG. 3) of the first embodiment, when the card reader 10j reads out the user identification code 5S, the job data obtaining portion 131 sends the job request data 6F to the server 2, and downloads the pull print job data 6D. The job data obtaining portion 131 stores the pull print job data 6D into the job data storage portion 136. Before obtaining the pull print job data 6D, the job data obtaining portion 131 obtains the job number data 6H from the server 2.

When the job number data 6H is obtained, the empty job region reserving portion 132 switches the collective printing mode from OFF to ON. The empty job region reserving portion 132 then adds, to the queue data 6R, the empty job region codes 5E whose total number corresponds to the number indicated in the job number data 6H. When the job identification codes 5J are already registered in the queue data 6R, the empty job region codes 5E may be added in advance of the job identification codes 5J already registered as shown in FIG. 22A, or, alternatively, may be added to the bottom of the queue data 6R as shown in FIG. 22B. In either case, the empty job region codes 5E whose total number corresponds to the number indicated in the job number data 6H are grouped and added to the queue data 6R.

The job registration processing portion 133 performs processing for entering a print job into a queue in the following manner.

When the job data obtaining portion 131 obtains the pull print job data 6D, the job registration processing portion 133 issues a unique job identification code 5J, and replaces an empty job region code 5E of the queue data 6R with the unique job identification code 5J. When the queue data 6R contains a plurality of empty job region codes 5E, the empty job region code 5E listed at the top of the queue data 6R is replaced with the unique job identification code 5J. The job registration processing portion 133 associates the obtained pull print job data 6D with the job identification code 5J, and stores the resultant into the job data storage portion 136.

When data for direct printing (print data 6A and so on) is transmitted from the terminal 3 without the server 2, the job registration processing portion 133 performs processing similar to that by the job registration processing portion 102 of the first embodiment. To be specific, the job registration processing portion 133 issues a unique job identification code 5J and adds the unique job identification code 5J to the bottom of the queue data 6R. The job registration processing portion 133 then integrates the data for direct printing into one set of direct print job data 6K, and associates the direct print job data 6K with the unique job identification code 5J to store the resultant into the job data storage portion 136.

The job execution control portion 134 controls the printing unit 10f and so on as discussed below so that a print job is executed.

The job execution control portion 134 retrieves the queue data 6R from the queue data storage portion 135.

If the code indicated in the top of the queue data 6R is a job identification code 5J, then the job execution control portion 134 retrieves job data associated with the job identification code 5J (pull print job data 6D or direct print job data 6K)

from the job data storage portion 136. The job execution control portion 134 then controls the printing unit 10*f* and so on in such a manner that the print job is executed based on the job data thus retrieved.

In contrast, if the code indicated in the top of the queue data 6R is an empty job region code 5E, then the job execution control portion 134 waits for a print job to be executed. When the empty job region code 5E is replaced with a job identification code 5J, then the job execution control portion 134 retrieves pull print job data 6D associated with the job identification code 5J from the job data storage portion 136. The job execution control portion 134 then controls the printing unit 10*f* and so on in such a manner that the print job is executed based on the pull print job data 6D retrieved.

Figure 24:
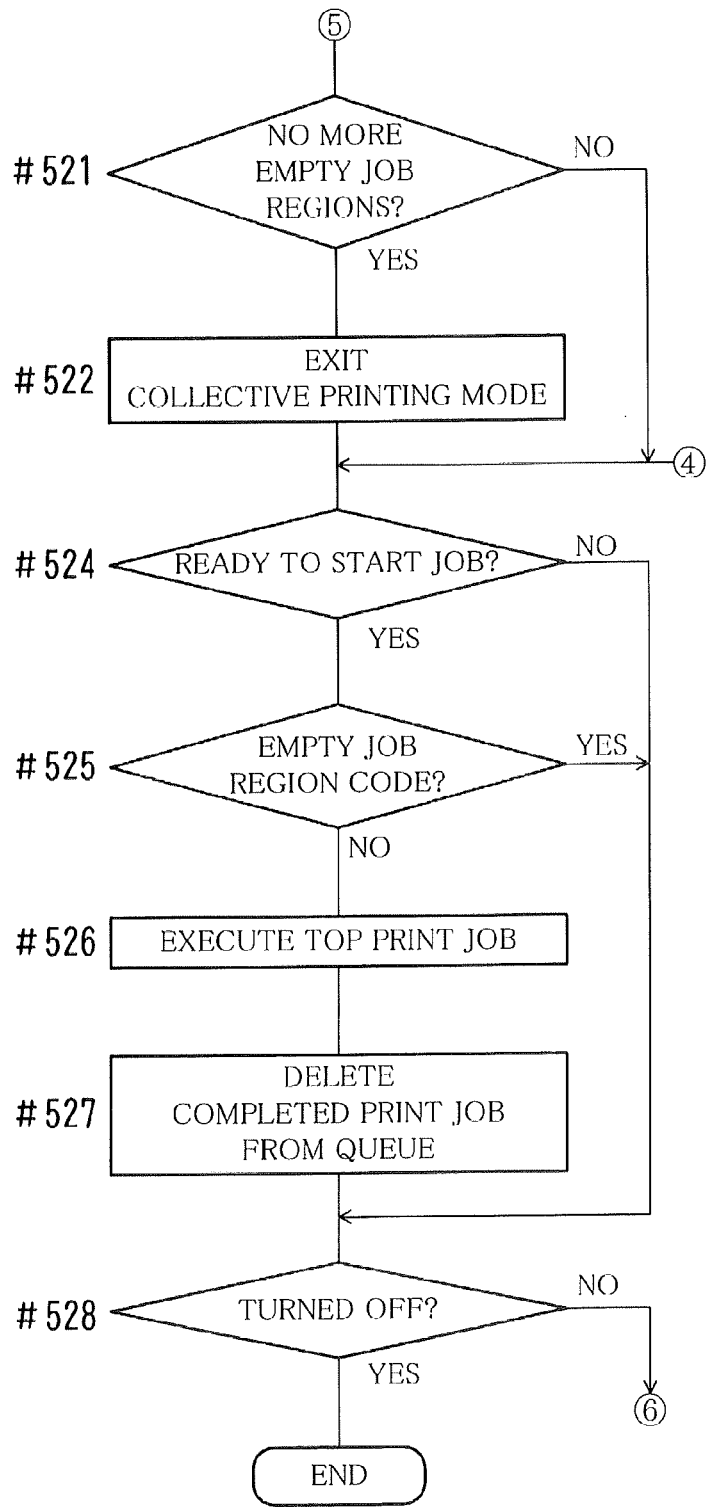
FIG. 24 is a flowchart for depicting an example of the flow of the overall processing performed by an image forming apparatus.

FIGS. 23 and 24 are flowcharts for depicting an example of the flow of the overall processing performed by the image forming apparatus 1.

The description goes on to the flow of print job-related processing performed by the image forming apparatus 1 with reference to the flowcharts of FIGS. 23 and 24.

Referring to FIGS. 23 and 24, when being turned ON, the image forming apparatus 1 performs the initialization processing (Step #501). The image forming apparatus 1 waits for an event to occur (Step #502). The event is, for example, receiving data from another device, receiving operation made by a user, or completing the active print job. When such an event occurs (Yes in Step #503), the image forming apparatus 1 performs processing as described below depending on the event.

When the user brings the IC card 50 into contact with the card reader 10*j* (Yes in Step #511), as with Step #12 through Step #16 of the first embodiment (see FIG. 7), the image forming apparatus 1 reads out a user identification code 5S (Step #512), and requests the server 2 to send job data of a user corresponding to the user identification code 5S (Step #513). The image forming apparatus 1 receives user authentication result data 6G and job number data 6H (Step #514 and Step #515), and goes into the collective printing mode (Step #516).

Further, in the third embodiment, the image forming apparatus 1 makes a group of empty job region codes 5E whose number corresponds to the number indicated in the job number data 6H, and adds the group of empty job region codes 5E to the queue data 6R (Step #517).

When receiving print job data from the server 2 or the terminal 3 (Yes in Step #518), the image forming apparatus 1 issues a new job identification code 5J and performs processing in the following manner depending on the type of the print job data.

When the received print job data is one for pull printing (Yes in Step #519), the image forming apparatus 1 replaces an empty job region code 5E listed at the top of the queue data 6R with the new job identification code 5J, and associates the received print job data (pull print job data 6D) with the new job identification code 5J to store the resultant into the job data storage portion 136 (Step #520). At a time when the queue data 6R has no more empty job region codes 5E (Yes in Step #521), the collective printing mode is switched from ON to OFF (Step #522).

On the other hand, when the received print job data is one for direct printing (No in Step #519), the image forming apparatus 1 adds the new job identification code 5J to the bottom of the queue data 6R, and associates the received print job data with the new job identification code 5J to store the resultant into the job data storage portion 136 as the direct print job data 6K (Step #523).

When the image forming apparatus 1 is ready to start the next print job (Yes in Step #524), and when the code indicated in the top of the queue data 6R is a job identification code 5J (No in Step #525), the image forming apparatus 1 executes a print job based on print job data associated with the job identification code 5J (Step #526). After that, the job identification code 5J is deleted from the queue data 6R (Step #527). On the other hand, when the image forming apparatus 1 is ready to start the next print job (Yes in Step #524), and when the code indicated in the top of the queue data 6R is an empty job region code 5E (Yes in Step #525), the image forming apparatus 1 waits for a print job to be executed. In such a case, when the empty job region code 5E is replaced with the job identification code 5J (Step #520), the print job is executed in the foregoing steps.

While the image forming apparatus 1 is turned ON (No in Step #528), after the completion of the processing corresponding to the event, the process goes back to Step #502, and the image forming apparatus 1 waits for a new event to occur.

Figure 25:
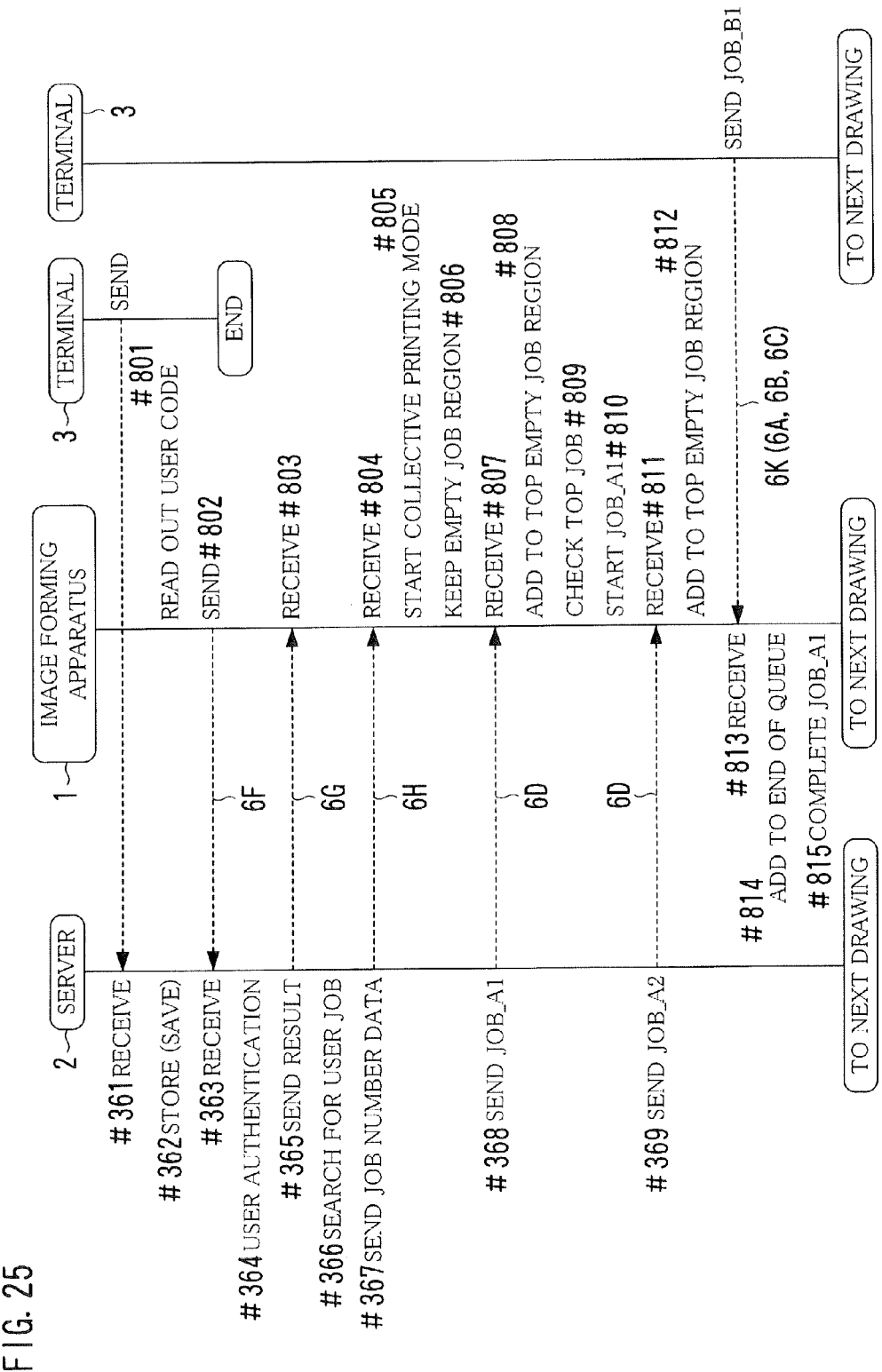
FIG. 25 is a sequence diagram for depicting an example of the flow of the processing performed by devices in a network printing system.
Figure 26:
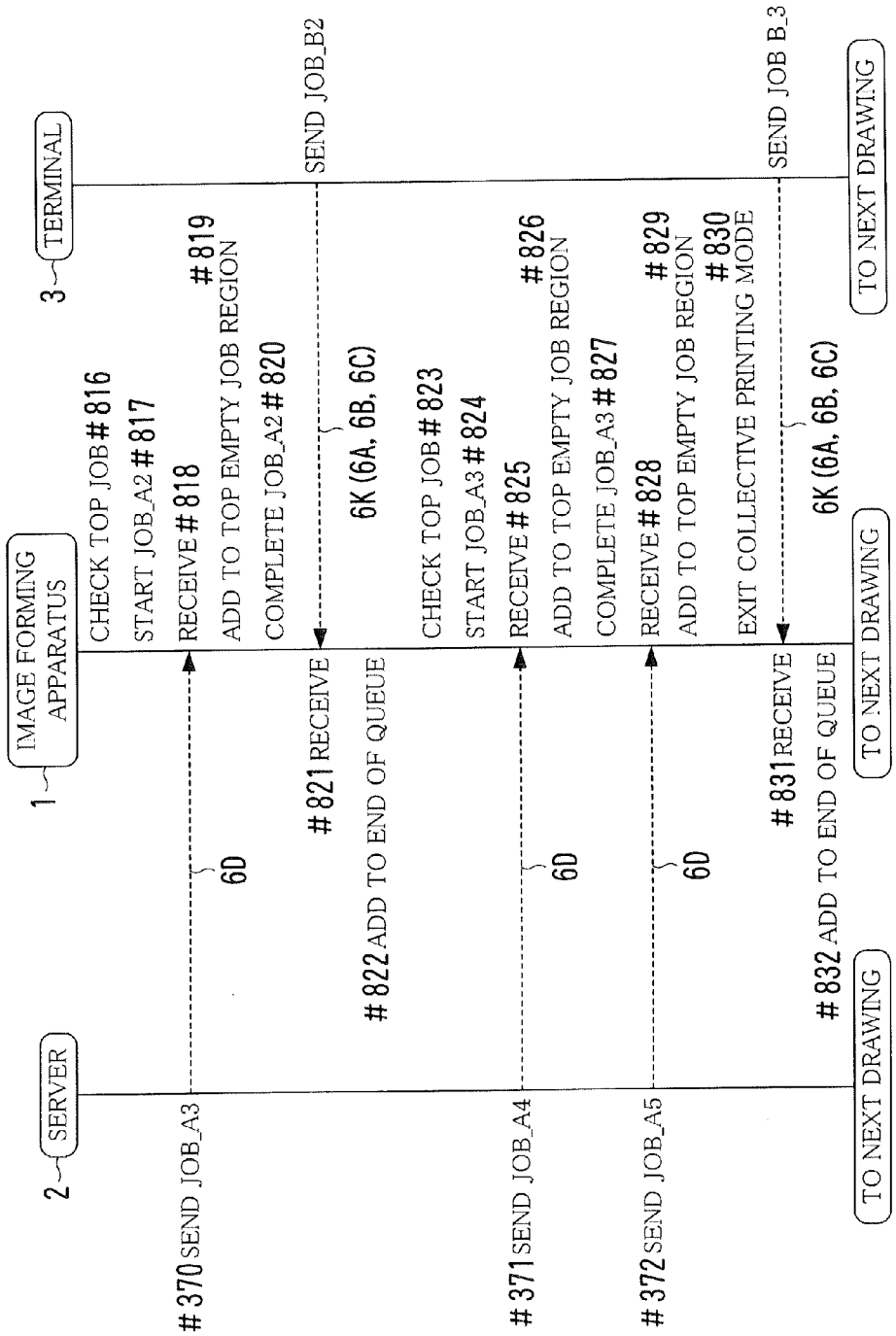
FIG. 26 is a sequence diagram for depicting an example of the flow of the processing performed by devices in a network printing system.
Figure 27:
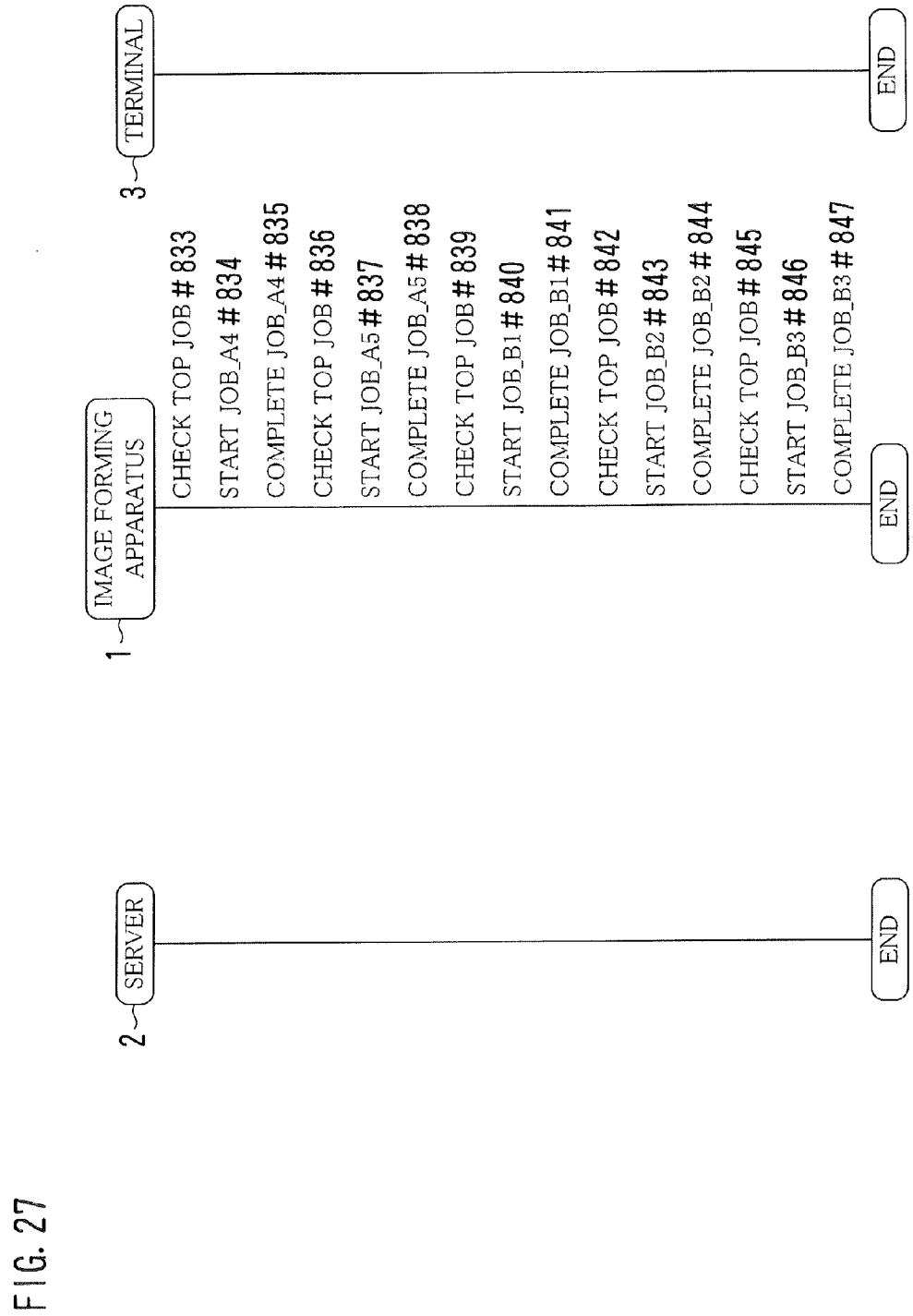
FIG. 27 is a sequence diagram for depicting an example of the flow of the processing performed by devices in a network printing system.
Figure 28:
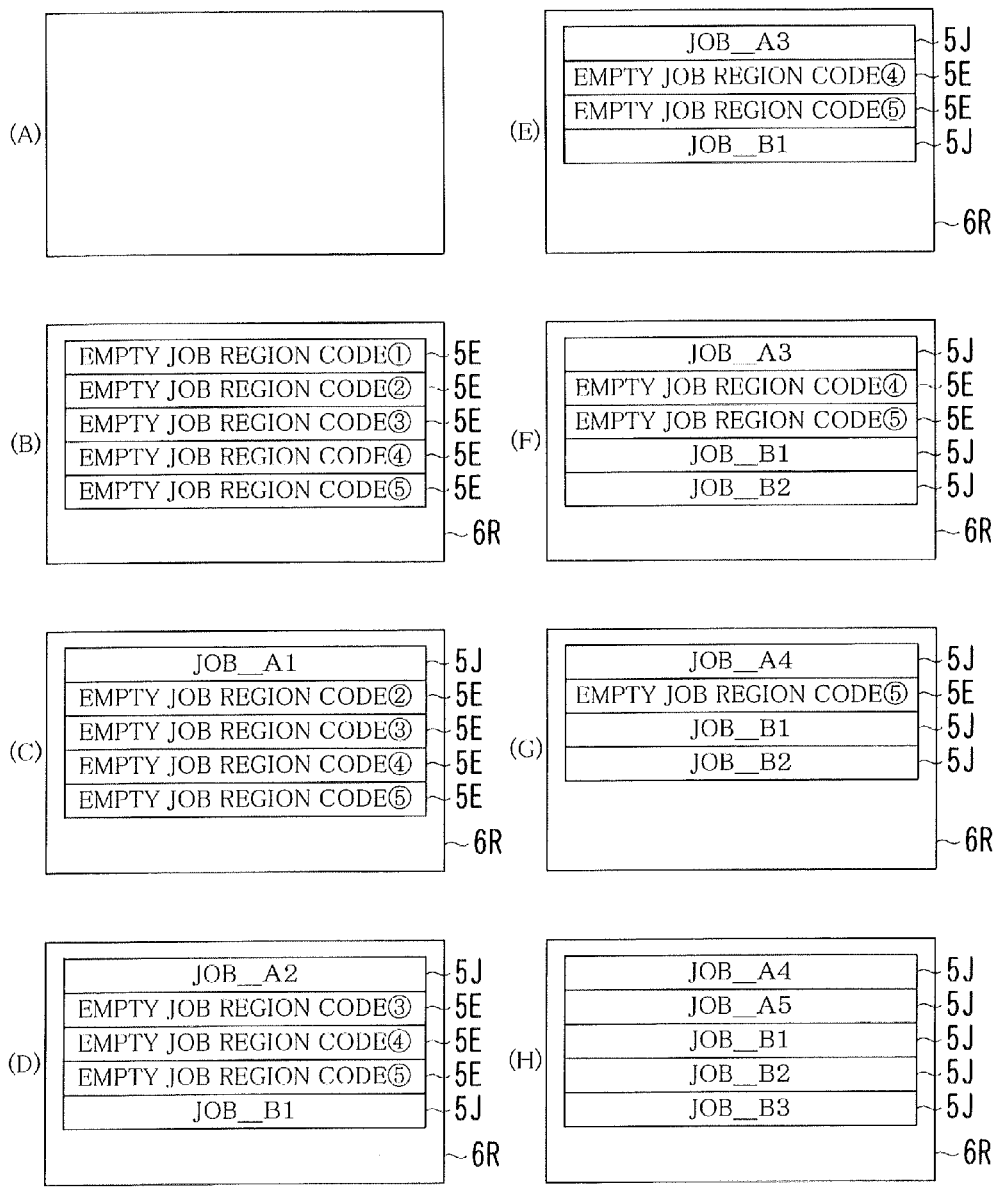
FIG. 28 is a diagram showing an example of a transition of queue data.

FIGS. 25-27 are sequence diagrams for depicting an example of the flow of the processing performed by the devices in the network printing system 1NP. FIG. 28 is a diagram showing an example of a transition of queue data 6R.

The description goes on to an example of the flow of processing performed by the devices of the network printing system 1NP for a case where a user A gives a plurality of pull print job commands with reference to the sequence diagrams of FIGS. 25-27 and so on. Descriptions of parts that are identical with those in FIGS. 9-11 shall be omitted.

The terminal 3 sends data on each document prepared by the user A (print data 6A, conditions data 6B, and user identification data 6C) to the server 2.

Referring to FIGS. 25-27, as with Step #301 and Step #302 of the first embodiment, when receiving the print data 6A and so on (Step #361), the server 2 generates pull print job data 6D which contains the received print data 6A and so on, and stores the pull print job data 6D into the job data storage portion 206 (Step #362).

The user A touches his/her IC card 50 onto the card reader 10*j*. In response to this operation, the image forming apparatus 1 reads out a user identification code 5S from the IC card 50 (Step #801), and sends job request data 6F to the server 2 (Step #802) as with Step #701 and Step #702 of the first embodiment.

In response to this operation, the server 2 performs processing similar to that of Step #303 through Step #307 of the first embodiment. To be specific, upon the receipt of the job request data 6F (Step #363), the server 2 performs user authentication (Step #364), and sends user authentication result data 6G to the image forming apparatus 1 (Step #365). When the user A is successfully authenticated, the server 2 searches for pull print job data 6D for the user A (Step #366), and sends job number data 6H showing the number of sets of pull print job data 6D to the image forming apparatus 1 (Step #367).

Upon the receipt of the user authentication result data 6G and the job number data 6H (Step #803 and Step #804), the image forming apparatus 1 goes into the collective printing mode (Step #805), and secures the empty job region codes 5E whose number corresponds to the number indicated in the job number data 6H into the queue data 6R (Step #806).

As with the first embodiment, after sending the job number data 6H, the server 2 sends the sets of pull print job data 6D for the user A one by one to the image forming apparatus 1 (Step #368 through Step #372).

Each time when receiving the pull print job data 6D (Step #807, Step #811, Step #818, Step #825, or Step #828), the image forming apparatus 1 issues a new job identification code 5J to replace the empty job region code 5E listed at the top of the queue data 6R with the new job identification code 5J, and associates the received pull print job data 6D with the new job identification code 5J to store the resultant into the job data storage portion 136 (Step #808, Step #812, Step #819, Step #826, or Step #829).

The processing to be performed for the case where data for direct printing is received from the terminal 3 is similar to that of the first embodiment. To be specific, when receiving data for direct printing (Step #813, Step #821, or Step #831), the image forming apparatus 1 issues a new job identification code 5J to add the new job identification code 5J to the bottom of the queue data 6R, and associates direct print job data 6K containing the received data with the new job identification code 5J to store the resultant into the job data storage portion 136 (Step #814, Step #822, or Step #832).

Hereinafter, in the third embodiment, each of the processing for adding a job identification code 5J to the queue data 6R to store job data into the job data storage portion 136, and, the processing for replacing an empty job region code 5E with a job identification code 5J to store job data into the job data storage portion 136 is referred to as "registration processing".

According to the illustrated example of FIGS. 25-27, job_A1 through job_A5, which are pull print jobs instructed by the user A, and job_B1 through job_B3, which are direct print jobs instructed by a user B, are sent to the image forming apparatus 1 in the order of job_A1, job_A2, job_B1, job_A3, job_B2, job_A4, job_A5, and job_B3. In Step #807 at which data on job_A1 is received, no empty job region code 5E and no job identification code 5J is contained in the queue data 6R as shown in (A) of FIG. 28.

After the job number data 6H is received, in Step #806, empty job region codes 5E whose number corresponds to the number indicated in the job number data 6H, i.e., five empty job region codes 5E are added to the queue data 6R as shown in (B) of FIG. 28. Further, by the registration processing in Step #808, the top empty job region code 5E is replaced with the job identification code 5J of job_A1 as shown in (C) of FIG. 28.

After the registration processing of job_A1 is completed, the image forming apparatus 1 checks the code listed at the top of the queue data 6R (Step #809). As shown in (C) of FIG. 28, since the top code is a job identification code 5J, the image forming apparatus 1 starts a print job corresponding to the job identification code 5J, namely, job_A1 (Step #810). In relation to the start of job_A1, the job identification code 5J of job_A1 is deleted from the queue data 6R. The same applies to job identification codes 5J of the other jobs.

While executing job_A1, the image forming apparatus 1 receives data on job_A2 and data on job_B1, and performs the registration processing for both the jobs (Step #811 through Step #814). Thereby, as shown in (D) of FIG. 28, one of the empty job region codes 5E is replaced with the job identification code 5J of job_A2, and the job identification code 5J of job_B1 is added to the queue data 6R.

Every time when a print job is finished, the image forming apparatus 1 deletes job data for the print job from the job data storage portion 136.

When finishing job_A1 (Step #815), the image forming apparatus 1 checks the code listed at the top of the queue data 6R (Step #816). As shown in (D) of FIG. 28, since the top code is a job identification code 5J, the image forming apparatus 1 starts a print job corresponding to the job identification code 5J, namely, job_A2 (Step #817).

While executing job_A2, the image forming apparatus 1 receives data on job_A3, and performs the registration processing for job_A3 (Step #818 and Step #819). Thereby, as shown in (E) of FIG. 28, one of the empty job region codes 5E is replaced with the job identification code 5J of job_A3.

Almost at the same time with the completion of job_A2 (Step #820), the image forming apparatus 1 receives data on job_B2, and performs registration processing for job_B2 (Step #821 and Step #822). Thereby, as shown in (F) of FIG. 28, the job identification code 5J of job_B2 is added to the queue data 6R.

Further, the image forming apparatus 1 checks the code listed at the top of the queue data 6R (Step #823). As shown in (F) of FIG. 28, since the top code is a job identification code 5J, the image forming apparatus 1 starts a print job corresponding to the job identification code 5J, namely, job_A3 (Step #824).

While executing job_A3, the image forming apparatus 1 receives data on job_A4, and performs the registration processing for job_A4 (Step #825 and Step #826). Thereby, as shown in (G) of FIG. 28, one of the empty job region codes 5E is replaced with the job identification code 5J of job_A4.

Almost at the same time with the completion of job_A3 (Step #827), the image forming apparatus 1 receives data on job_A5 and data on job_B3, and performs registration processing for job_A5 and for job_B3 (Step #828, Step #829, Step #831, and Step #832). Thereby, as shown in (H) of FIG. 28, one of the empty job region codes 5E is replaced with the job identification code 5J of job_A5, and the job identification code 5J of job_B3 is added to the queue data 6R.

At a time when the queue data 6R has no more empty job region codes 5E, the image forming apparatus 1 exits the collective printing mode (Step #830).

Since the image forming apparatus 1 exits the collective printing mode, the image forming apparatus 1 executes print jobs in the order of job identification codes 5J shown in the queue data 6R (see (H) of FIG. 28) (Step #833 through Step #847). In the queue data 6R, the job identification codes 5J of the pull print jobs instructed by the logged-in user (user A) are listed in advance of job identification codes 5J of the other jobs. Thus, the execution orders of the pull print jobs instructed by the logged-in user take precedence over the execution orders of the other jobs.

According to the third embodiment, it is possible to prevent desired printed matters produced based on print jobs instructed by a specific user from mixing with another printed matter produced based on a print job instructed by another user.

In the foregoing third embodiment, the case is described in which one server 2 is installed in the network printing system. The foregoing method using the empty job region code 5E is also applicable to the case where the host server 2A and at least one slave server 2B are installed in the network printing system. In such a case, the job data obtaining portion 131 (see FIG. 20) preferably sends the job request data 6F to the host server 2A as with the second embodiment. Further, the job number data 6H is preferably received from the host server 2A, and the pull print job data 6D is preferably received from the host server 2A and the slave server 2B.

Fourth Embodiment

Figure 29:
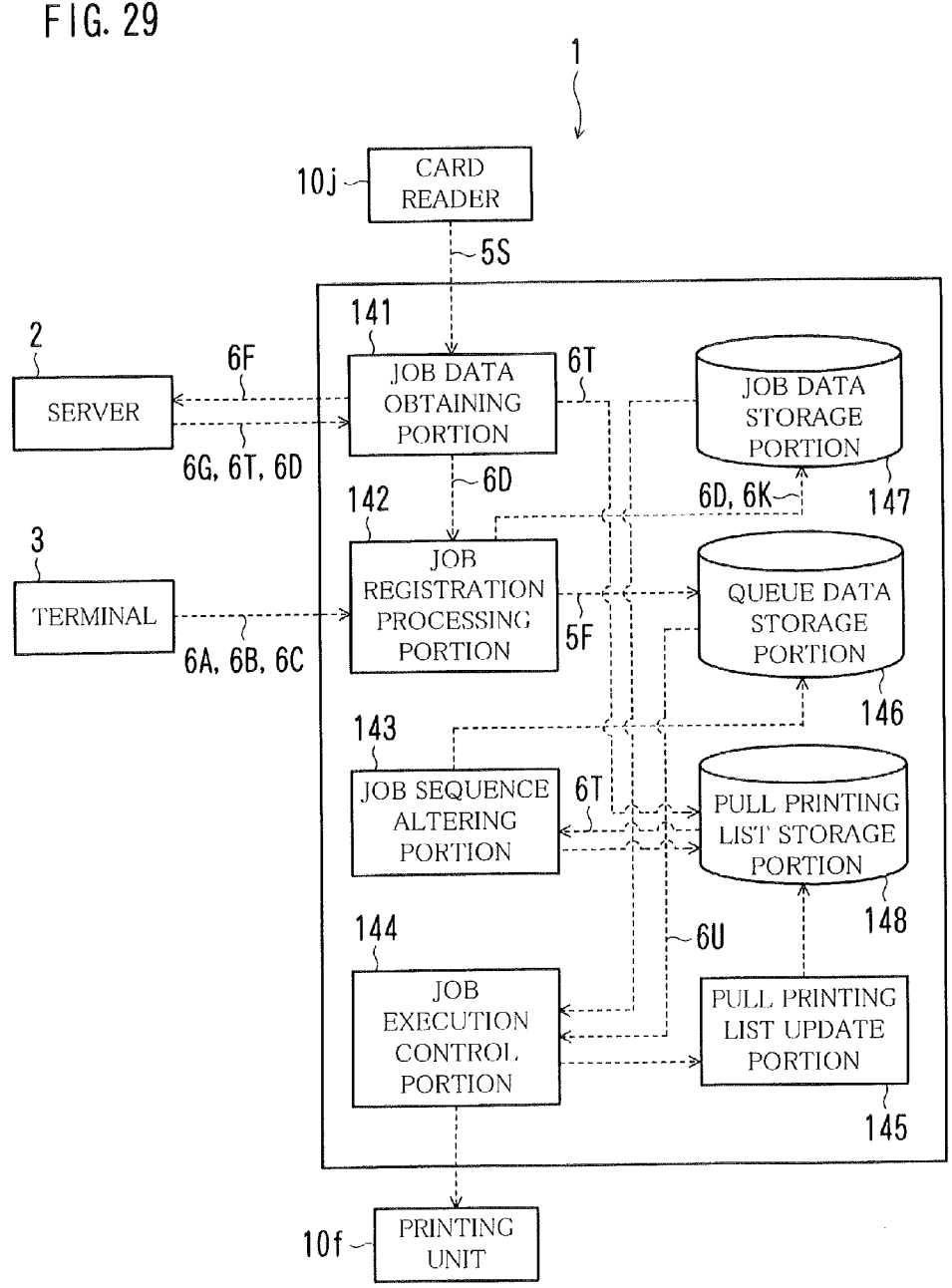
FIG. 29 is a diagram showing an example of the functional configuration of an image forming apparatus.
Figure 30:
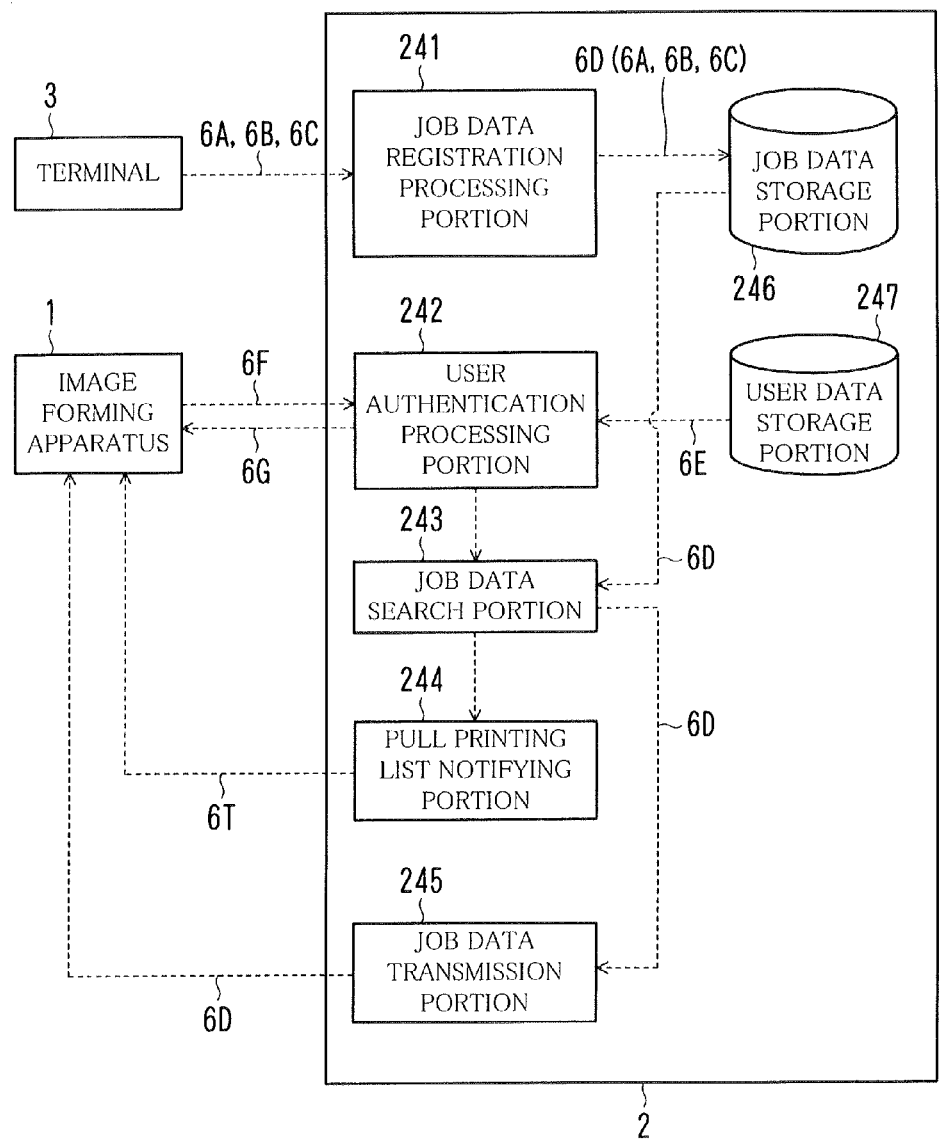
FIG. 30 is a diagram showing an example of the functional configuration of a server.

FIG. 29 is a diagram showing an example of the functional configuration of the image forming apparatus 1; and FIG. 30 is a diagram showing an example of the functional configuration of the server 2.

The overall configuration of the network printing system 1NP according to the fourth embodiment is similar to that of the first embodiment as shown in FIG. 1.

The roles played by the devices in the network printing system 1NP according to the fourth embodiment are similar to those of the first embodiment. However, a method for determining the change in collective printing mode is different between the first embodiment and the fourth embodiment. The below description focuses on the determining method.

The hardware configuration of the image forming apparatus 1 is similar to that in the first embodiment as shown in FIG. 2. The ROM or the large-capacity storage has installed therein software for implementing the functions of a job data obtaining portion 141, a job registration processing portion 142, a job sequence altering portion 143, a job execution control portion 144, a pull printing list update portion 145, a queue data storage portion 146, a job data storage portion 147, a pull printing list storage portion 148, and so on, all of which are shown in FIG. 29.

The hardware configuration of the server 2 is similar to that in the first embodiment as shown in FIG. 4. The ROM or the large-capacity storage has installed therein software for implementing the functions of a job data registration processing portion 241, a user authentication processing portion 242, a job data search portion 243, a pull printing list notifying portion 244, a job data transmission portion 245, a job data storage portion 246, a user data storage portion 247, and so on, all of which are shown in FIG. 30.

The description goes on to print job processing performed by the individual portions of the image forming apparatus 1 shown in FIG. 29, the individual portions of the server 2 shown in FIG. 30, and the terminal 3. Descriptions of parts that are identical with those in the first embodiment shall be omitted.

The terminal 3 sends print data 6A of a document, conditions data 6B, and user identification data 6C to the server 2 or the image forming apparatus 1 as with the first embodiment.

The job data registration processing portion 241 of the server 2 receives the print data 6A and so on from the terminal 3 as with the job data registration processing portion 201 (see FIG. 5) of the first embodiment. The job data registration processing portion 241 combines the print data 6A and so on to generate one set of pull print job data 6D, which is stored into the job data storage portion 246.

When the card reader 10j reads out the user identification code 5S, the job data obtaining portion 141 of the image forming apparatus 1 sends the job request data 6F to the server 2 to download the pull print job data 6D as with the job data obtaining portion 101 of the first embodiment. The pull print job data 6D is then stored into the job data storage portion 147. Note that, before obtaining the pull print job data 6D, the job data obtaining portion 141 obtains pull printing list data 6T rather than the job number data 6H from the server 2 as discussed later.

The user authentication processing portion 242 and the user data storage portion 247 have functions similar to those of the user authentication processing portion 202 and the user data storage portion 207 of the first embodiment respectively.

As with the job data search portion 203 of the first embodiment, the job data search portion 243 searches for pull print job data 6D indicating the user identification code 5S shown in the job request data 6F (i.e., user identification code 5S of the logged-in user).

The pull printing list notifying portion 244 generates data indicating file names 5F of the individual sets of pull print job data 6D found out by the search by the job data search portion 243, and sends the generated data as the pull printing list data 6T to the image forming apparatus 1.

As with the job data transmission portion 205 of the first embodiment, the job data transmission portion 245 transmits the pull print job data 6D found out by the search by the job data search portion 243 to the image forming apparatus 1.

Note that the pull printing list data 6T is transmitted to the image forming apparatus 1 prior to the pull print job data 6D. In the image forming apparatus 1, the pull printing list data 6T is stored into the pull printing list storage portion 148. Upon the receipt of the pull printing list data 6T, the image forming apparatus 1 goes into the collective printing mode.

The job registration processing portion 142 performs processing for entering a print job into a queue in the following manner.

The queue data storage portion 146 stores queue data 6U in advance. The queue data 6U has file names 5F indicated therein; however, at the beginning, no file name 5F is indicated therein.

When the job data obtaining portion 141 obtains pull print job data 6D, the job registration processing portion 142 adds the file name 5F of the pull print job data 6D to the bottom of the queue data 6U. The job registration processing portion 142 stores the pull print job data 6D into the job data storage portion 147.

When print data 6A, conditions data 6B, and user identification data 6C are transmitted from the terminal 3 without the server 2, the job registration processing portion 142 brings the received data together to generate one set of direct print job data 6K, and stores the direct print job data 6K into the job data storage portion 147. Note that the direct print job data 6K is given a file name 5F. The job registration processing portion 142 adds the file name 5F of the direct print job data 6K to the bottom of the queue data 6U.

In this way, according to the fourth embodiment, the file name 5F rather than the job identification code 5J is written onto the queue data.

The job sequence altering portion 143 performs processing for altering the sequence of file names 5F in the queue data 6U as follows.

The job sequence altering portion 143 checks whether or not the file name 5F listed at the top of the queue data 6U is indicated in the pull printing list data 6T. If the file name 5F is indicated therein, then the job sequence altering portion 143 does not alter the sequence of file names 5F in the queue data 6U. Otherwise, the job sequence altering portion 143 updates the queue data 6U in such a manner that the file name 5F is listed at the bottom thereof. Thereby, the order of a job involving using the job data corresponding to the file name 5F is changed to the last.

The job execution control portion 144 controls the printing unit 10f and so on as discussed below so that a print job is executed.

The job execution control portion 144 retrieves the queue data 6U from the queue data storage portion 146. The job execution control portion 144 retrieves job data having the file name 5F listed at the top of the queue data 6U from the job data storage portion 147. The retrieved job data is the pull print job data 6D or the direct print job data 6K. The job execution control portion 144 then controls the printing unit 10f and so on in such a manner that the print job is executed based on the job data thus retrieved. When the image forming apparatus 1 is put in the collective printing mode, the job sequence altering portion 143 modifies the queue data 6Q as needed, and then, the post-modified queue data 6Q is retrieved.

After a pull print job is executed, the pull printing list update portion 145 performs processing for deleting the file name 5F of the pull print job data 6D used to execute the pull print job from the pull printing list data 6T stored in the pull printing list storage portion 148. Further, at a time when the queue data 6U has no more file names, the pull printing list update portion 145 performs processing for deleting the pull printing list data 6T from the pull printing list storage portion 148.

Figure 31:
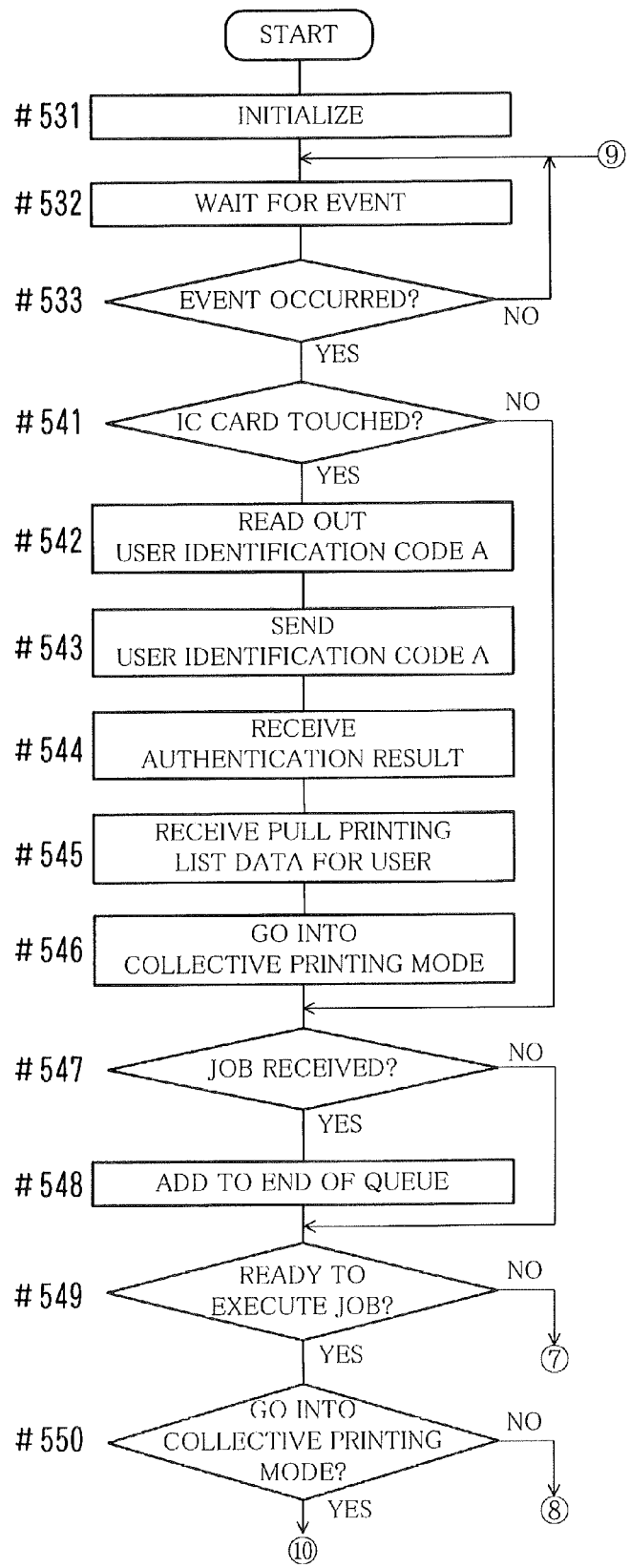
FIG. 31 is a flowchart for depicting an example of the flow of the overall processing performed by an image forming apparatus.
Figure 32:
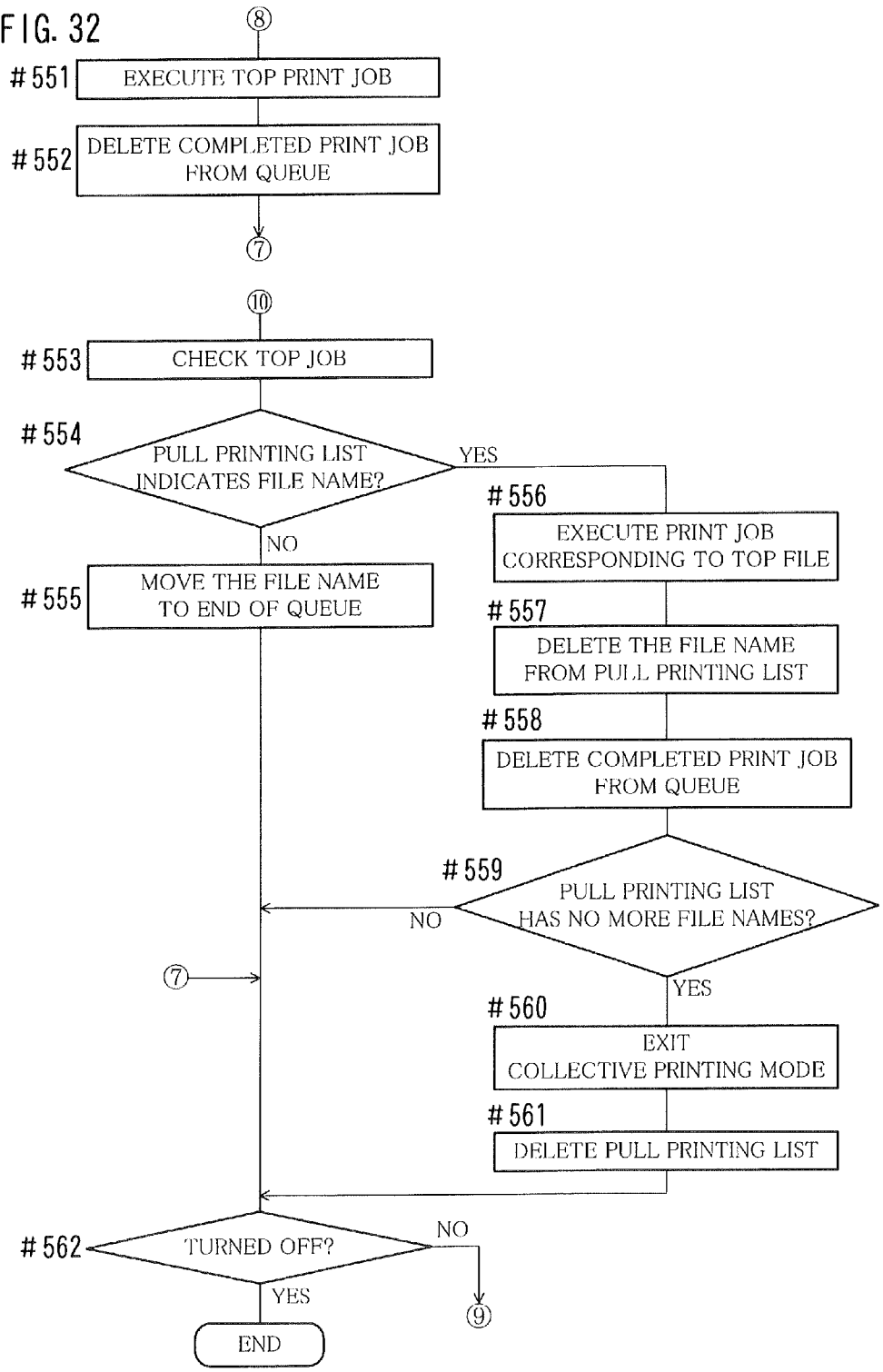
FIG. 32 is a flowchart for depicting an example of the flow of the overall processing performed by an image forming apparatus.

FIGS. 31 and 32 are flowcharts for depicting an example of the flow of the overall processing performed by the image forming apparatus 1.

The description goes on to the flow of print job-related processing performed by the image forming apparatus 1 with reference to the flowcharts of FIGS. 31 and 32.

Referring to FIGS. 31 and 32, when being turned ON, the image forming apparatus 1 performs the initialization processing (Step #531). The image forming apparatus 1 waits for an event to occur (Step #532). The event is, for example, receiving data from another device, receiving operation made by a user, or completing the active print job. When such an event occurs (Yes in Step #533), the image forming apparatus 1 performs processing as described below depending on the event.

When the user brings the IC card 50 into contact with the card reader 10j (Yes in Step #541), the image forming apparatus 1 reads out a user identification code 5S from the IC card 50 (Step #542) as with Step #11 and Step #12 of the first embodiment (see FIG. 7), and requests the server 2 to send job data of a user corresponding to the user identification code 5S (Step #543). The image forming apparatus 1 receives the user authentication result data 6G (Step #544), receives, as the foregoing group information, pull printing list data 6T (Step #545), and goes into the collective printing mode (Step #546).

When receiving print job data from the server 2 or the terminal 3 (Yes in Step #547), the image forming apparatus 1 adds the file name 5F of the print job to the bottom of the queue data 6U, and stores the received data into the job data storage portion 147 (Step #548).

When being ready to start the next print job (Yes in Step #549), and when being not placed in the collective printing mode (No in Step #550), the image forming apparatus 1 executes a print job corresponding to the file name 5F listed at the top of the queue data 6U (Step #551 of FIG. 32), and deletes the file name 5F from the queue data 6U (Step #552). In contrast, when being placed in the collective printing mode (Yes in Step #550), the image forming apparatus 1 executes a print job in the following manner.

To be specific, the image forming apparatus 1 checks whether or not the file name 5F listed at the top of the queue data 6U is indicated in the pull printing list data 6T (Step #553). If the file name 5F is not indicated therein (No in Step #554), then the file name 5F is moved to the bottom of the queue data 6U (Step #555). On the other hand, if the file name 5F is indicated in the pull printing list data 6T (Yes in Step #554), then the image forming apparatus 1 executes the print job by using job data (pull print job data 6D) corresponding to the file name 5F (Step #556). The image forming apparatus 1 then deletes the file name 5F from the queue data 6U and the pull printing list data 6T (Step #557 and Step #558). At a time when the pull printing list data 6T has no more file names 5F (Yes in Step #559), the image forming apparatus 1 exits the collective printing mode (Step #560), and deletes the pull printing list data 6T (Step #561).

While the image forming apparatus 1 is turned ON (No in Step #562), after the completion of the processing corresponding to the event, the process goes back to Step #532 in which the image forming apparatus 1 waits for a new event to occur.

In the foregoing fourth embodiment, the case is described in which one server 2 is installed in the network printing system. The foregoing method using the pull printing list data 6T is also applicable to the case where the host server 2A and at least one slave server 2B are installed in the network printing system. In such a case, the job data obtaining portion 141 (see FIG. 29) preferably sends the job request data 6F to the host server 2A as with the second embodiment. Further, the pull printing list data 6T is preferably received from the host server 2A, and the pull print job data 6D is preferably received from the host server 2A and the slave server 2B.

According to the fourth embodiment, it is possible to prevent desired printed matters produced based on print jobs instructed by a specific user from mixing with another printed matter produced based on a print job instructed by another user.

Fifth Embodiment

Figure 33:
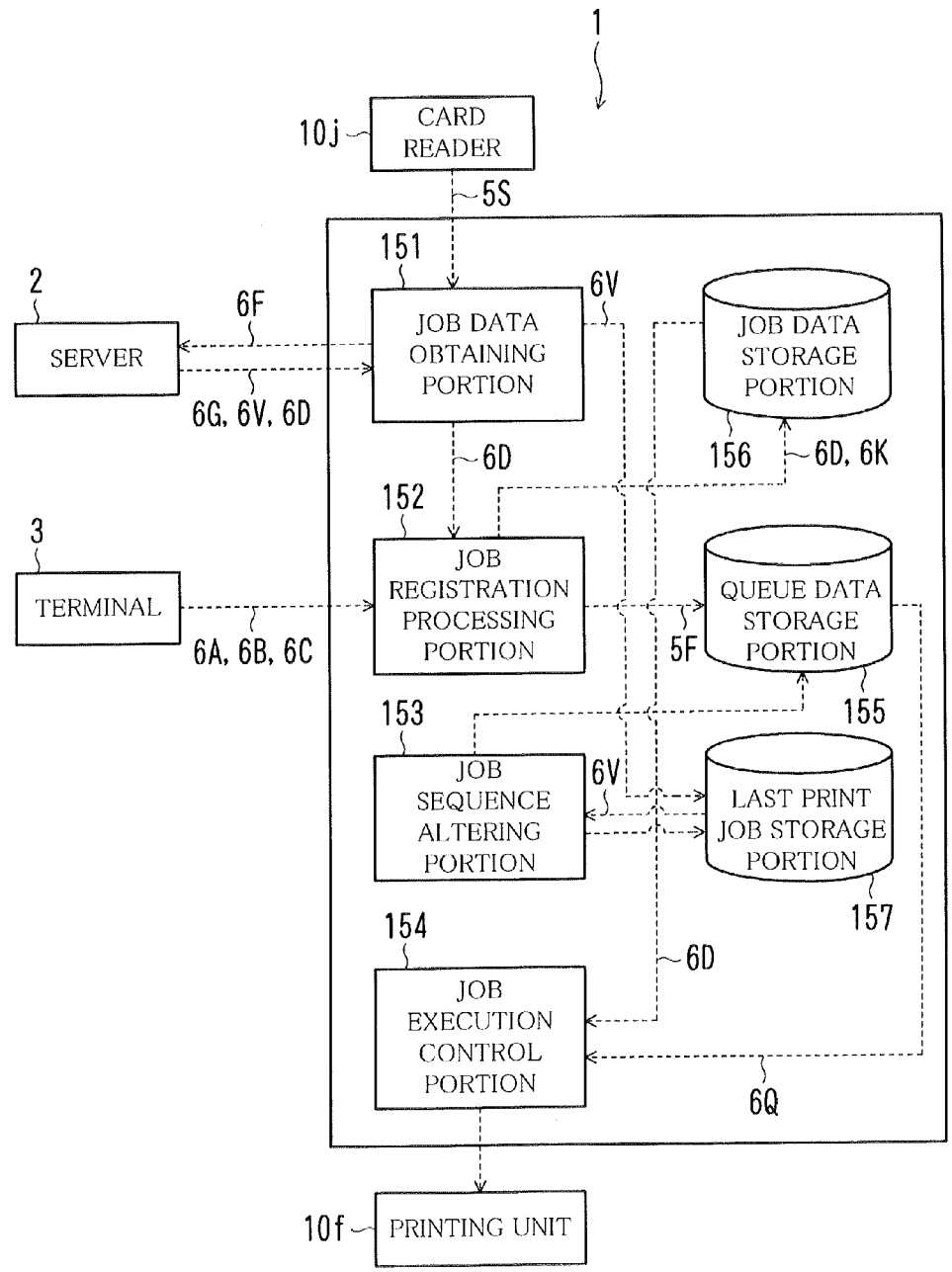
FIG. 33 is a diagram showing an example of the functional configuration of an image forming apparatus.
Figure 34:
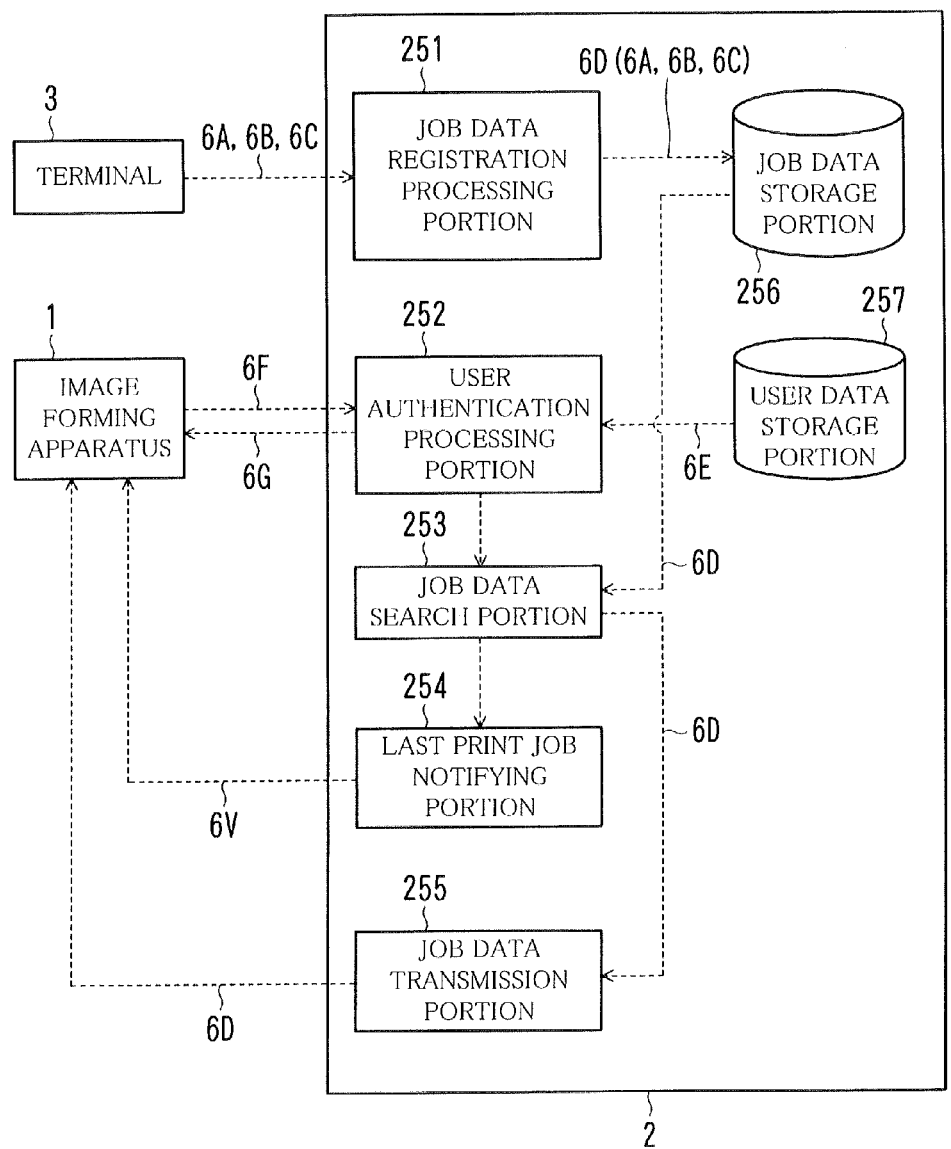
FIG. 34 is a diagram showing an example of the functional configuration of a server.

FIG. 33 is a diagram showing an example of the functional configuration of the image forming apparatus 1; and FIG. 34 is a diagram showing an example of the functional configuration of the server 2.

The overall configuration of the network printing system 1NP according to the fifth embodiment is similar to that of the first embodiment as shown in FIG. 1.

The roles played by the devices in the network printing system 1NP according to the fifth embodiment are similar to those of the first embodiment. However, a method for determining the change in collective printing mode is different between the first embodiment and the fifth embodiment. The below description focuses on the determining method.

The hardware configuration of the image forming apparatus 1 is similar to that in the first embodiment as shown in FIG. 2. The ROM or the large-capacity storage has installed therein software for implementing the functions of a job data obtaining portion 151, a job registration processing portion 152, a job sequence altering portion 153, a job execution control portion 154, a queue data storage portion 155, a job data storage portion 156, a last print job storage portion 157, and so on, all of which are shown in FIG. 33.

The hardware configuration of the server 2 is similar to that in the first embodiment as shown in FIG. 4. The ROM or the large-capacity storage has installed therein software for implementing the functions of a job data registration processing portion 251, a user authentication processing portion 252, a job data search portion 253, a last print job notifying portion 254, a job data transmission portion 255, a job data storage portion 256, a user data storage portion 257, and so on, all of which are shown in FIG. 34.

The description goes on to print job processing performed by the individual portions of the image forming apparatus 1 shown in FIG. 33, the individual portions of the server 2 shown in FIG. 34, and the terminal 3. Descriptions of parts that are identical with those in the first embodiment shall be omitted.

The terminal 3 sends print data 6A of a document, conditions data 6B, and user identification data 6C to the server 2 or the image forming apparatus 1 as with the first embodiment.

The job data obtaining portion 151, the job registration processing portion 152, the job execution control portion 154, the queue data storage portion 155, and the job data storage portion 156 of the image forming apparatus 1 have functions similar to those of the job data obtaining portion 101, the job registration processing portion 102, the job execution control portion 104, the queue data storage portion 106, and the job data storage portion 107 (see FIG. 3) of the first embodiment, respectively.

The job data registration processing portion 251, the user authentication processing portion 252, the job data search portion 253, the job data transmission portion 255, the job data storage portion 256, and the user data storage portion 257 of the server 2 have functions similar to those of the job data registration processing portion 201, the user authentication processing portion 202, the job data search portion 203, the job data transmission portion 205, the job data storage portion 206, and the user data storage portion 207 (see FIG. 5) of the first embodiment.

The last print job notifying portion 254 sends, as the foregoing group information, last print job identification data 6V to the image forming apparatus 1 instead of the job number data 6H. The last print job identification data 6V indicates a file name 5F corresponding to pull print job data 6D to be sent last to the image forming apparatus 1 among the pull print job data 6D found out by the search by the job data search portion 253.

The last print job identification data 6V is transmitted to the image forming apparatus 1 prior to the pull print job data 6D.

The last print job identification data 6V sent from the server 2 is stored into the last print job storage portion 157 of the image forming apparatus 1. Upon the receipt of the last print job identification data 6V, the image forming apparatus 1 goes into the collective printing mode.

The job sequence altering portion 153 performs processing for altering the sequence of job identification codes 5J in the queue data 6Q (see FIG. 6). The altering method is similar to that of the first embodiment. To be specific, if a job identification code 5J does not correspond to a pull print job instructed by the logged-in user, the job identification code 5J is moved to the bottom of the queue data 6Q.

When a print job is executed by using the pull print job data 6D corresponding to the file name 5F indicated in the last print job identification data 6V, then the job sequence altering portion 153 turns the collective printing mode from ON to OFF, and the altering processing is cancelled. The last print job identification data 6V is then deleted from the last print job storage portion 157.

Figure 35:
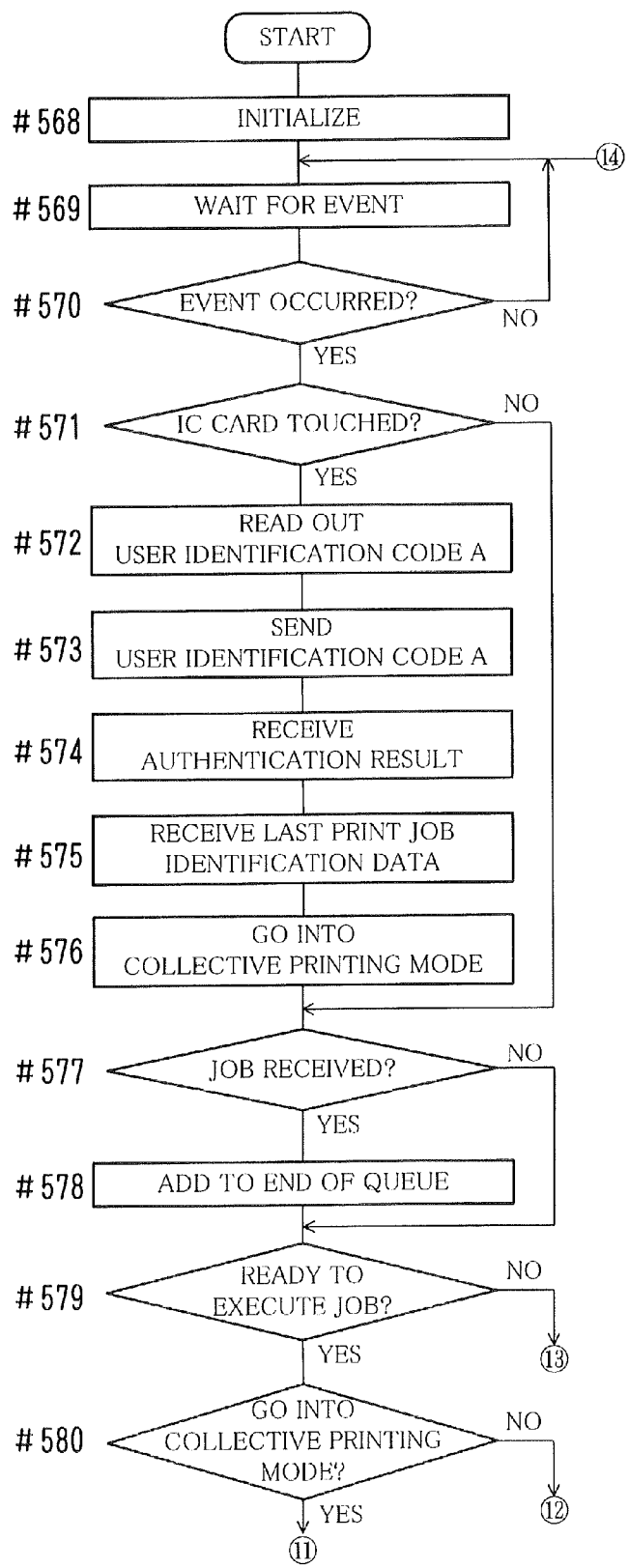
FIG. 35 is a flowchart for depicting an example of the flow of the overall processing performed by an image forming apparatus.
Figure 36:
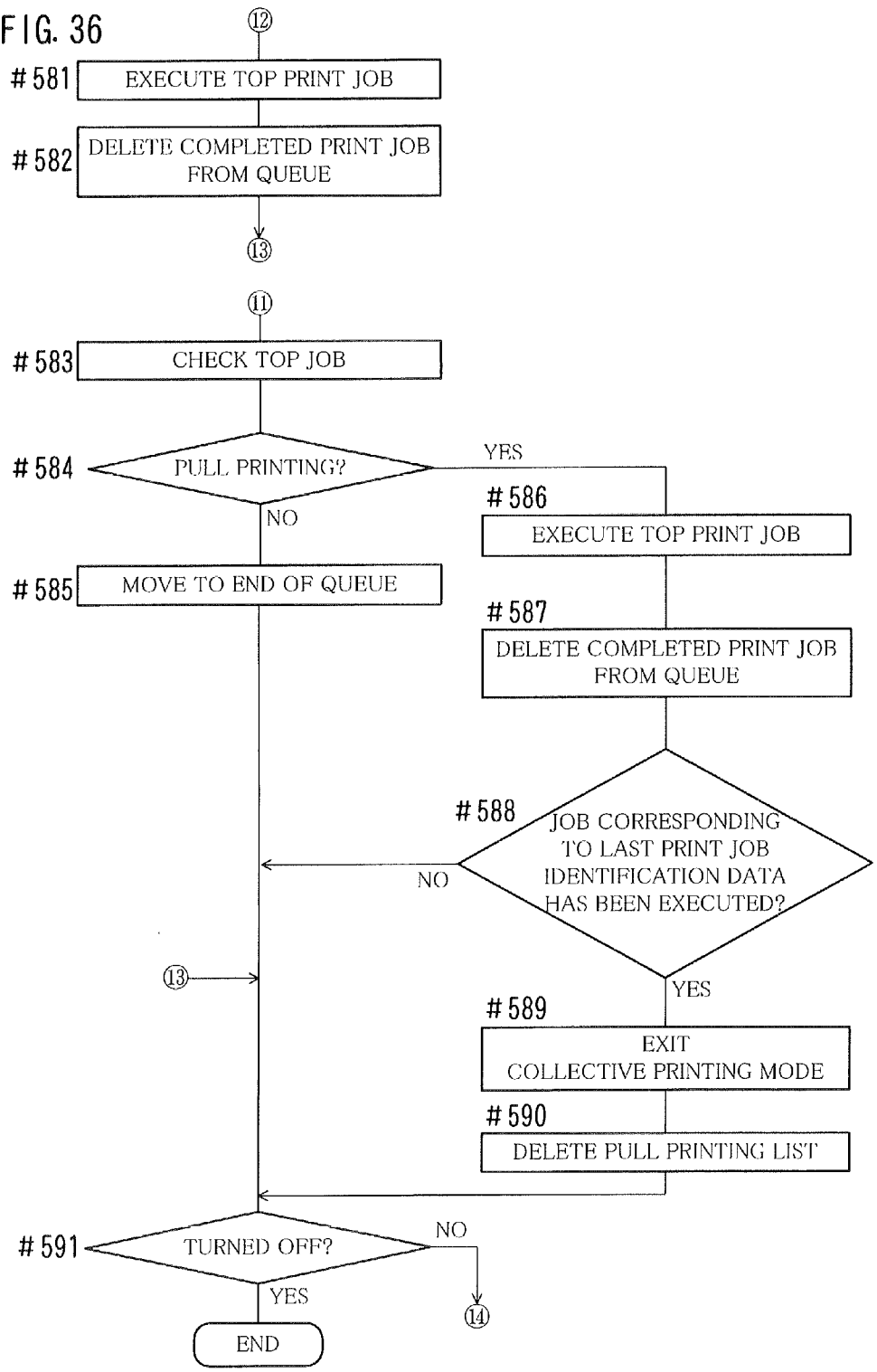
FIG. 36 is a flowchart for depicting an example of the flow of the overall processing performed by an image forming apparatus.

FIGS. 35 and 36 are flowcharts for depicting an example of the flow of the overall processing performed by the image forming apparatus 1.

The description goes on to the flow of print job-related processing performed by the image forming apparatus 1 with reference to the flowcharts of FIGS. 35 and 36.

Referring to FIGS. 35 and 36, when being turned ON, the image forming apparatus 1 performs the initialization processing (Step #568). The image forming apparatus 1 waits for an event to occur (Step #569). The event is, for example, receiving data from another device, receiving operation made by a user, or completing the active print job. When such an event occurs (Yes in Step #570), the image forming apparatus 1 performs processing as described below depending on the event.

The processing performed in Step #571 through Step #576 for a case where the user brings the IC card 50 into contact with the card reader 10j is basically the same as that in Step #11 through Step #16 (see FIG. 7) of the first embodiment. However, in Step #575, the image forming apparatus 1 receives, as the group information, the last print job identification data 6V rather than the job number data 6H.

The processing in Step #577 and Step #578 performed for a case where print job data is received from the server 2 or the terminal 3 is the same as that in Step #17 and Step #18 of the first embodiment.

The processing in Step #579 through Step #590 performed for a case where the image forming apparatus 1 is ready to start the next print job is basically the same as that in Step #19 through Step #30 of the first embodiment. In the first embodiment, whether all the pull print jobs instructed by a logged-in user are completed or not is determined by counting the number of execution times of pull print jobs. On the other hand, in the fifth embodiment, this is determined by checking whether or not a file name of used job data corresponds to the file name 5F indicated in the last print job identification data 6V (Step #588).

While the image forming apparatus 1 is turned ON (No in Step #591), after the completion of the processing corresponding to the event, the process goes back to Step #569 in which the image forming apparatus 1 waits for a new event to occur.

In the fifth embodiment, the sequence of print jobs is managed by writing the job identification codes 5J onto the queue data 6Q. Instead of this, however, the sequence of print jobs may be managed by writing the file names 5F onto the queue data 6Q as with the fourth embodiment.

According to the fifth embodiment, it is possible to prevent desired printed matters produced based on print jobs instructed by a specific user from mixing with another printed matter produced based on a print job instructed by another user without counting the number of pull print jobs instructed by the specific user or without generating a list.

Sixth Embodiment

Figure 37:
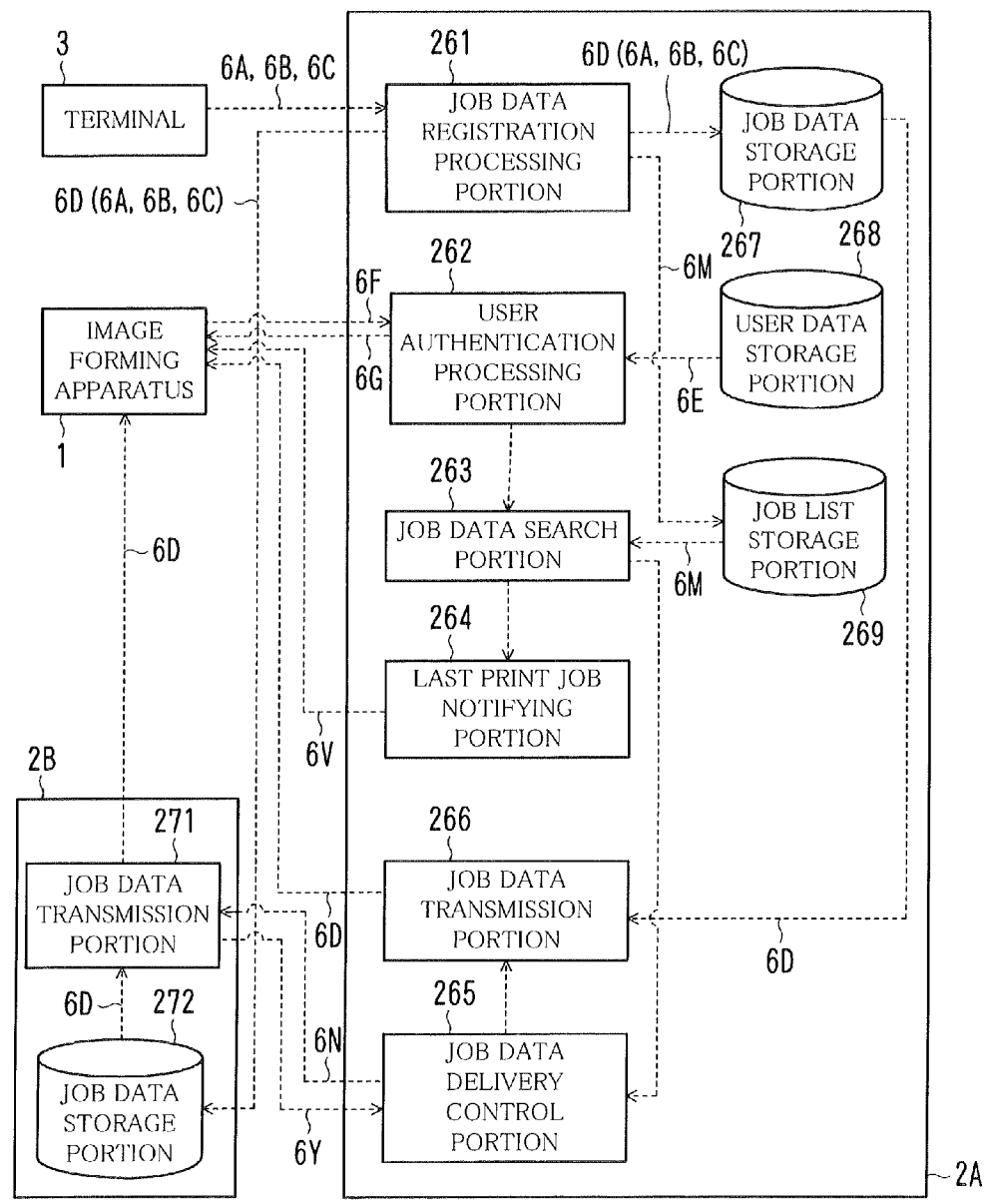
FIG. 37 is a diagram showing an example of the functional configurations of a host server and a slave server.

FIG. 37 is a diagram showing an example of the functional configurations of the host server 2A and the slave server 2B.

In the fifth embodiment, a plurality of sets of pull print job data 6D is stored into one server. In contrast, in the sixth embodiment, a plurality of sets of pull print job data 6D is distributed among a plurality of servers for storage as with the second embodiment.

The overall configuration of the network printing system in the sixth embodiment is similar to that in the second embodiment as shown in FIG. 13.

The image forming apparatus 1 and the terminal 3 have functions similar to those in the fifth embodiment. Accordingly, the description on the image forming apparatus 1 and the terminal 3 is omitted.

The roles played by the host server 2A and the slave server 2B are similar to those in the second embodiment. As with the fifth embodiment, the host server 2A sends the last print job identification data 6V to the image forming apparatus 1. However, a time at which the pull print job data 6D is sent is different between the fifth embodiment and the sixth embodiment. The below description focuses on the difference.

Each of the hardware configurations of the host server 2A and the slave server 2B is similar to the hardware configuration of the server 2 in the second embodiment as shown in FIG. 5.

With the host server 2A, the ROM or the large-capacity storage stores, therein, software for implementing a job data registration processing portion 261, a user authentication processing portion 262, a job data search portion 263, a last print job notifying portion 264, a job data delivery control portion 265, a job data transmission portion 266, a job data storage portion 267, a user data storage portion 268, a job list storage portion 269, and so on, all of which are shown in FIG. 37.

With the slave server 2B, the ROM or the large-capacity storage stores, therein, software for implementing a job data transmission portion 271, a job data storage portion 272, and so on.

Hereinafter, the functions of the host server 2A and the slave server 2B are described with reference to FIG. 37.

The processing for receiving print data 6A and so on from the terminal 3 to manage the same as the pull print job data 6D, the processing for user authentication, and the processing for searching for pull print job data 6D for a logged-in user are the same as those discussed earlier in the second embodiment.

To be specific, the job data registration processing portion 261, the user authentication processing portion 262, the job data search portion 263, the job data storage portion 267, the user data storage portion 268, and the job list storage portion 269 of the host server 2A have the same functions as those of the job data registration processing portion 211, the user authentication processing portion 212, the job data search portion 213, the job data storage portion 217, the user data storage portion 218, and the job list storage portion 219 (see FIG. 14) respectively in the second embodiment. The job data storage portion 272 of the slave server 2B has the same function as that of the job data storage portion 222 in the second embodiment.

However, the processing for sending pull print job data 6D to the image forming apparatus 1 is different from that of the second embodiment.

When the job data search portion 263 finds out pull print job data 6D for a logged-in user in response to job request data 6F from the image forming apparatus 1, the last print job notifying portion 264 sends, to the image forming apparatus 1, data indicating a file name 5F of the pull print job data 6D found out the last by the search as the last print job identification data 6V. Hereinafter, the pull print job data 6D found out the last is referred to as "last pull print job data 6De".

The job data delivery control portion 265 controls a time at which the pull print job data 6D found out by the search by the job data search portion 263 is delivered to the image forming apparatus 1 in the following manner.

The job data delivery control portion 265 instructs the job data transmission portion 266 to send pull print job data 6D stored in the job data storage portion 267 of the host server 2A among the sets of pull print job data 6D found out by the search by the job data search portion 263. Note, however, that the job data delivery control portion 265 instructs the job data transmission portion 266 not to send the last pull print job data 6De at this stage.

In parallel with this or before or after the same, the job data delivery control portion 265 instructs the slave server 2B to send, to the image forming apparatus 1, pull print job data 6D stored in the slave server 2B and found out through the search by the job data search portion 263. At this time, the transmission command data 6N indicating the file name 5F of the pull print job data 6D and the device identifier 5D of the image forming apparatus 1 is sent to the slave server 2B. Note that, in order to prevent the last pull print job data 6De from being sent, the file name 5F of the last pull print job data 6De is excluded.

The job data transmission portion 266 then sends, one by one, the sets of pull print job data 6D other than the last pull print job data 6De, for the logged-in user, stored in the job data storage portion 267 to the image forming apparatus 1.

In the slave server 2B, the job data transmission portion 271 sends the pull print job data 6D to the image forming apparatus 1 based on the transmission command data 6N sent from the host server 2A, as with the job data transmission portion 221 of the second embodiment. Further, in the sixth embodiment, after all the sets of pull print job data 6D are sent, transmission completion notifying data 6Y indicating that the transmission is completed is sent to the host server 2A.

After the job data transmission portion 266 and each of the slave servers 2B send all the sets of pull print job data 6D except for the last pull print job data 6De to the image forming apparatus 1 in accordance with the foregoing instructions, the job data delivery control portion 265 performs processing for sending the last pull print job data 6De in the following manner.

If the last pull print job data 6De is stored in the job data storage portion 267 of the host server 2A, then the job data delivery control portion 265 instructs the job data transmission portion 266 to send the last pull print job data 6De. In response to the instructions, the job data transmission portion 266 sends the last pull print job data 6De to the image forming apparatus 1.

If the last pull print job data 6De is stored in the slave server 2B, then the transmission command data 6N indicating the file name 5F of the last pull print job data 6De and the device identifier 5D of the image forming apparatus 1 is sent to the slave server 2B. Upon the receipt of the transmission command data 6N, the job data transmission portion 271 of the slave server 2B sends the last pull print job data 6De to the image forming apparatus 1 based on the transmission command data 6N.

The image forming apparatus 1 receives the last print job identification data 6V and the pull print job data 6D from the host server 2A or the slave server 2B, and performs processing similar to that in the fifth embodiment.

According to the sixth embodiment, even when data on pull print jobs are distributed among a plurality of servers for management, it is possible to prevent desired printed matters produced based on print jobs instructed by a specific user from mixing with another printed matter produced based on a print job instructed by another user without counting the number of pull print jobs instructed by the specific user or without generating a list.

In the first through sixth embodiments, a direct print job is taken as an example of a print job other than pull print jobs. Even if a copy job or a facsimile receiving job is added to a queue, the jobs are dealt with in the same manner as that for the direct print job, so that the foregoing advantages are produced.

It is to be understood that the configurations of the network printing systems 1NP and 1NP2, the image forming apparatus 1, the server 2, the host server 2A, and the slave server 2B, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A printing system having a print portion, the printing system comprising:
 a storage portion configured to store job data based on which a plurality of first print jobs is executed, the first print jobs being instructed by a specific user;
 an obtaining portion configured to, in response to a request made by the specific user, obtain group information on a group of the first print jobs; and
 a job execution portion configured to, after the print portion starts the first print jobs, leave a second print job other than the first print jobs unexecuted and execute all of the first print jobs based on the group information, and after that, execute the second print job; wherein
 the obtaining portion obtains, as the group information, information on a number of the first print jobs; and the printing system further comprises:
- a memory portion configured to store a job sequence based on which the first print jobs and the second print job are to be executed;
- a tentative reservation portion configured to, when the group information is received, add tentative print jobs to the job sequence in such a manner that the tentative print jobs are executed successively, a number of the tentative print jobs corresponding to the number indicated in the group information; and
- an altering portion configured to, when data for executing any one of the first print jobs is received from the server, alter the job sequence in such a manner that any one of the tentative print jobs is replaced with said any one of the first print jobs, wherein
- the job execution portion executes the first print jobs and the second print job based on the job sequence.

2. The printing system according to claim 1, wherein the obtaining portion obtains, as the group information, information on an identifier of each of the first print jobs.

3. The printing system according to claim 1, wherein the obtaining portion obtains, as the group information, information on an identifier of one of the first print jobs that is to be executed last.

4. The printing system according to claim 1, comprising
an authentication portion configured to perform user authentication of a user, and
a generating portion configured to, when the authentication portion verifies that the user is the specific user, generate information on the first print jobs; wherein
the obtaining portion obtains, as the group information, the information generated by the generating portion.

5. A printing device comprising:
- an obtaining portion configured to obtain group information on a group of a plurality of first print jobs, the first print jobs being instructed by a specific user and being stored in a server; and
- a job execution portion configured to, after the first print jobs are started, leave a second print job other than the first print jobs unexecuted and execute all of the first print jobs based on the group information, and after that, execute the second print job, wherein
- the obtaining portion obtains, as the group information, information on a number of the first print jobs; and
- the printing device further comprises:
- a memory portion configured to store a job sequence based on which the first print jobs and the second print job are to be executed;
- a tentative reservation portion configured to, when the group information is received, add tentative print jobs to the job sequence in such a manner that the tentative print jobs are executed successively, a number of the tentative print jobs corresponding to the number indicated in the group information; and
- an altering portion configured to, when data for executing any one of the first print jobs is received from the server, alter the job sequence in such a manner that any one of the tentative print jobs is replaced with said any one of the first print jobs, wherein
- the job execution portion executes the first print jobs and the second print job based on the job sequence.

6. The printing device according to claim 5, wherein the obtaining portion obtains, as the group information, information on an identifier of each of the first print jobs.

7. The printing device according to claim 5, wherein the obtaining portion obtains, as the group information, information on an identifier of one of the first print jobs that is to be executed last.

8. The printing device according to claim 5, comprising
an authentication portion configured to perform user authentication of a user, and
a generation control portion configured to, when the authentication portion verifies that the user is the specific user, control the server to generate information on the first print jobs; wherein
the obtaining portion obtains, as the group information, the information generated by the server.

9. A method for controlling a printing device, the method comprising:
- causing the printing device to obtain group information on a group of a plurality of first print jobs, the first print jobs being instructed by a specific user and being stored in a server; and
- causing the printing device to, after the first print jobs are started, leave a second print job other than the first print jobs unexecuted and execute all of the first print jobs based on the group information, and after that, execute the second print job;
- wherein the printing device is caused to obtain, as the group information, information on a number of the first print jobs; and
- the method for controlling the print device further comprises:
- causing the printing device to store a job sequence based on which the first print jobs and the second print job are to be executed;
- causing the printing device to, when the group information is received, add tentative print jobs to the job sequence in such a manner that the tentative print lobs are executed successively, a number of the tentative print jobs corresponding to the number indicated in the group information; and
- causing the printing device to, when data for executing any one of the first print jobs is received from the server, alter the job sequence in such a manner that any one of the tentative print jobs is replaced with said any one of the first print jobs, wherein
- the printing device is caused to execute the first print lobs and the second print job based on the job sequence.

10. The method according to claim 9, wherein the printing device is caused to obtain, as the group information, information on an identifier of each of the first print jobs.

11. The method according to claim 9, wherein the printing device is caused to obtain, as the group information, information on an identifier of one of the first print jobs that is to be executed last.

12. The method according to claim 9, comprising
performing user authentication of a user, and
when it is verified that the user is the specific user, causing the server to generate information on the first print jobs; wherein
the printing device is caused to obtain, as the group information, the information generated by the server.

13. A non-transitory computer-readable storage medium storing thereon a computer program for controlling a printing device, the computer program causing the printing device to perform processes comprising:
- obtaining group information on a group of a plurality of first print jobs, the first print jobs being instructed by a specific user and being stored in a server; and after the first print jobs are started, leaving a second print job other than the first print jobs unexecuted and executing all of the first print jobs based on the group information, and after that, executing the second print job,
wherein the printing device is caused to obtain, as the group information, information on a number of the first print jobs; and the computer program further causes the printing device to perform processes comprising:

storing a job sequence based on which the first print jobs and the second print job are to be executed;

adding, when the group information is received, tentative print jobs to the job sequence in such a manner that the tentative print jobs are executed successively, a number of the tentative print jobs corresponding to the number indicated in the group information; and altering, when data for executing any one of the first print jobs is received from the server, the job sequence in such a manner that any one of the tentative print jobs is replaced with said any one of the first print jobs, wherein the executing of the first print jobs and the second print job is based on the job sequence.

14. The non-transitory computer-readable storage medium according to claim 13, wherein the printing device is caused to obtain, as the group information, information on an identifier of each of the first print jobs.

15. The non-transitory computer-readable storage medium according to claim 13, wherein the printing device is caused to obtain, as the group information, information on an identifier of one of the first print jobs that is to be executed last.

16. The non-transitory computer-readable storage medium according to claim 13, comprising causing the printing device to perform user authentication of a user, and when it is verified that the user is the specific user, causing the printing device to control the server to generate information on the first print jobs; wherein the printing device is caused to obtain, as the group information, the information generated by the server.

* * * * *